United States Patent
Srinivasan

(10) Patent No.: US 7,577,305 B2
(45) Date of Patent: Aug. 18, 2009

(54) SPATIAL EXTRAPOLATION OF PIXEL VALUES IN INTRAFRAME VIDEO CODING AND DECODING

(75) Inventor: Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 121 days.

(21) Appl. No.: 11/441,699

(22) Filed: May 26, 2006

(65) Prior Publication Data

US 2006/0215919 A1    Sep. 28, 2006

Related U.S. Application Data

(63) Continuation of application No. 10/322,171, filed on Dec. 17, 2002, now Pat. No. 7,116,830.

(60) Provisional application No. 60/341,674, filed on Dec. 17, 2001.

(51) Int. Cl.
*G06K 9/36* (2006.01)
*G06K 9/46* (2006.01)

(52) U.S. Cl. ........................ 382/238; 382/233

(58) Field of Classification Search .................. None
See application file for complete search history.

(56) References Cited

U.S. PATENT DOCUMENTS

| | | | |
|---|---|---|---|
| 5,068,724 A | 11/1991 | Krause et al. | |
| 5,260,783 A | 11/1993 | Dixit | |
| 5,442,400 A | 8/1995 | Sun et al. | |
| 5,467,086 A | 11/1995 | Jeong | |
| 5,467,134 A | 11/1995 | Laney et al. | |
| 5,544,286 A | 8/1996 | Laney | |
| 5,764,814 A | 6/1998 | Chen et al. | |
| 5,778,098 A | 7/1998 | Lee et al. | |
| 5,799,113 A | 8/1998 | Lee | |
| 5,802,213 A | 9/1998 | Gardos | |
| 5,850,294 A * | 12/1998 | Apostolopoulos et al. | 358/426.14 |
| 5,946,043 A | 8/1999 | Lee et al. | |
| 5,952,943 A | 9/1999 | Walsh et al. | |
| 5,959,673 A | 9/1999 | Lee et al. | |
| 5,970,173 A | 10/1999 | Lee et al. | |
| 6,058,212 A | 5/2000 | Yokoyama | |
| 6,148,109 A | 11/2000 | Boon et al. | |
| 6,215,425 B1 | 4/2001 | Andrews et al. | |
| 6,215,910 B1 | 4/2001 | Chaddha | |
| 6,236,764 B1 | 5/2001 | Zhou | |

(Continued)

FOREIGN PATENT DOCUMENTS

EP    279053    8/1988

OTHER PUBLICATIONS

CCITT Recommendation T.81, "Digital Compression and Coding of Continuous-Tone Still Images," pp. 1-20, H-1-H-6 (1992).

(Continued)

*Primary Examiner*—Matthew C Bella
*Assistant Examiner*—Yuzhen Ge
(74) *Attorney, Agent, or Firm*—Klarquist Sparkman, LLP

(57) ABSTRACT

Techniques and tools for spatial extrapolation of pixel values in intraframe video encoding and/or decoding are described. For example, to predict the pixel values for a block of pixels, a video encoder or decoder uses spatial extrapolation from the pixel values of pixels in a causal neighborhood for the block of pixels.

23 Claims, 25 Drawing Sheets

U.S. PATENT DOCUMENTS

| | | |
|---|---|---|
| 6,281,942 B1 | 8/2001 | Wang |
| 6,292,588 B1 | 9/2001 | Shen et al. |
| 6,300,888 B1 | 10/2001 | Chen et al. |
| 6,339,656 B1 | 1/2002 | Marui |
| 6,571,016 B1 | 5/2003 | Mehrotra et al. |
| 6,654,419 B1 | 11/2003 | Sriram et al. |
| 6,728,414 B1 * | 4/2004 | Chang et al. ............... 382/254 |
| 6,765,964 B1 * | 7/2004 | Conklin ................ 375/240.14 |
| 2002/0097802 A1 | 7/2002 | Lin et al. |
| 2003/0099292 A1 | 5/2003 | Wang et al. |
| 2005/0135484 A1 | 6/2005 | Lee et al. |

OTHER PUBLICATIONS

Fernandez i Ubiergo, "Lossless Region-based Multispectal Image Compression," $6^{th}$ Int'l Conf. on Image Processing and its Applications, vol. 1, 5 pp. (1997).

Guenter et al., "Motion Compensated Compression of Computer Animation Frames," Proc. SIGGRAPH 93, 8 pp. (1993).

Heising et al., "Video Coding Using Spatial Extrapolation Based Motion Field Segmentation," IEEE Int. Conf. Image Processing, vol. 2, 4 pp. (1996).

ISO/IEC, "ISO/IEC 11172-2, Information technology—Coding of moving pictures and associated audio for digital storage media at up to about 1,5 Mbit/s—Part 2: Video," 112 pp. (1993).

ISO/IEC 14496-2, "Coding of Audio-Visual Objects: Visual, ISO/IEC 14496-2," pp. i-v, 136-144, 229 (1998).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at p x 64 kbits," 25 pp. (1993).

ITU-T, "ITU-T Recommendation H.262, Information Technology—Generic Coding of Moving Pictures and Associated Audio Information: Video," 205 pp. (1995).

ITU-T,"ITU-T Recommendation H.263, Video coding for low bit rate communication," 162 pp. (1998).

ITU-T Recommendation H.263, "Series H: Audiovisual and Multimedia Systems, Infrastructure of Audiovisual Services—Coding of Moving Video," International Telecommunication Union, pp. i-x, 4, 73-84 (Feb. 1998).

Liang et al., "Fast Multiplierless Approximation of the DCT with the Lifting Scheme," Proc. SPIE Apps. of Digital Image Procesing XXIII, 12 pp. (Aug. 2000).

Mehrotra et al., "Adaptive Coding Using Finite State Hierarchical Table Lookup Vector Quantization with Variable Block Sizes," 5 pp. (1996).

Pennebaker et al., "JPEG: Still Image Data Compression Standard," Van Nostrand Reinhold, New York, pp. vii-xi, 92-93, 109-116, 182-185, 190-198, 257-259, 332-333, 631 (1993).

Printouts of FTP directories from http://ftp3.itu.ch , 8 pp. (downloaded from the World Wide Web on Sep. 20, 2005.).

Reader, "History of MPEG Video Compression—Ver. 4.0," 99 pp., document marked Dec. 16, 2003.

Study Group 16—Contribution 999, "Draft Text of Recommendation H.263 Version 2 ("H.263+") for Decision," International Telecommunication Union, 17 pp. (1997).

Sullivan et al., "The H.264/AVC Advanced Video Coding Standard: Overview and Introduction to the Fidelity Range Extensions," 21 pp. (Aug. 2004).

Tseng et al., "Compatible Video Coding of Stereoscopic Sequences Using MPEG-2's Scalability and Interlaced Structure," Int'l Workshop on HDTV '94, Torino, Italy, 10 pp. (1994).

Wang et al., "Lossless Wavelet Coder with Adaptive Orientional Prediction," TENCON '99, 3 pp. (1999).

Wiegand, "Joint Model No. 1, Revision 1 (JM1-r1)," JVT-A003r1, 80 pp. (document marked "Generated: 2002-01-18").

Wien et al., "16 Bit Adaptive Block size Transforms," JVT-C107r1, 54 pp. (document marked "$3^{rd}$ Meeting: Fairfax, Virginia, USA 6-1 May, 2002").

Bjontegaard,"H.26L Test Model Long Term No. 5 (TML-5) draft0," q15k59d1.doc, 35 pp. (document marked Oct. 2000).

* cited by examiner

Figure 1, prior art
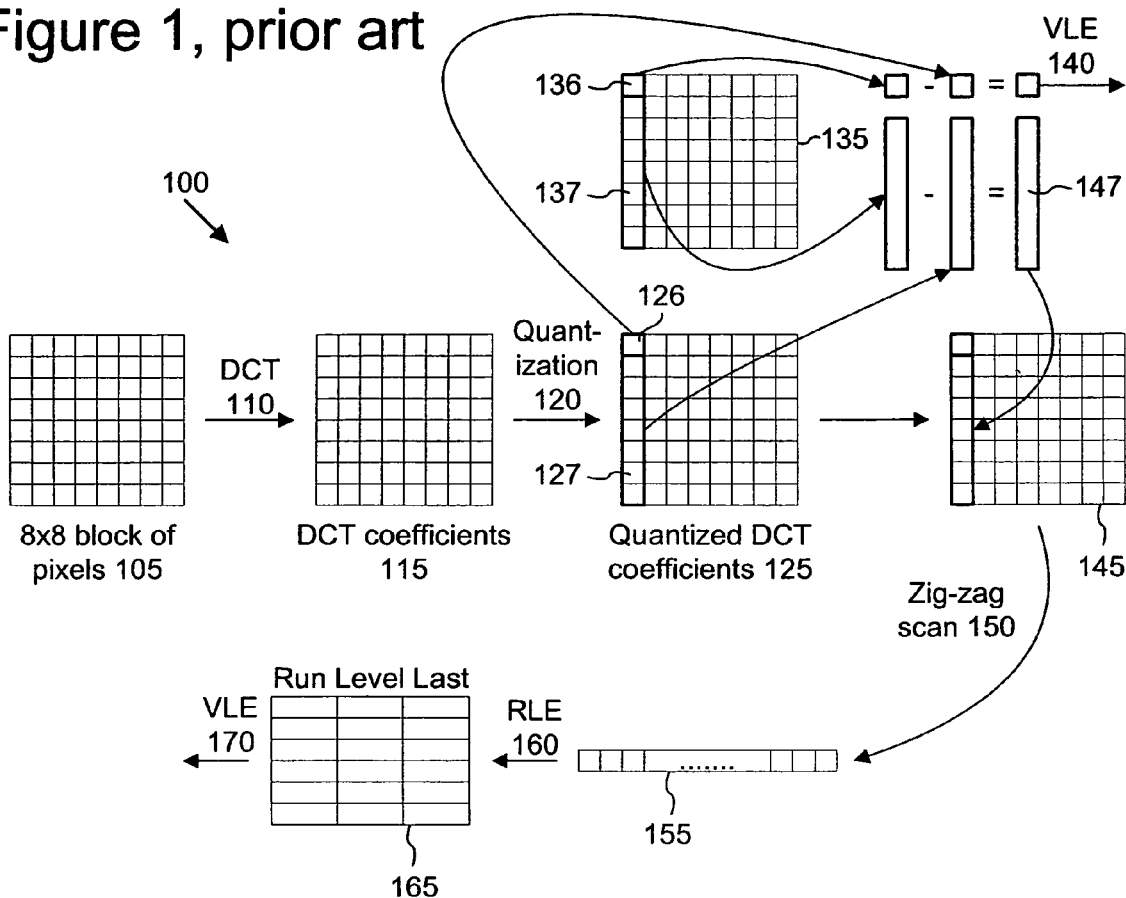
Figure 2, prior art
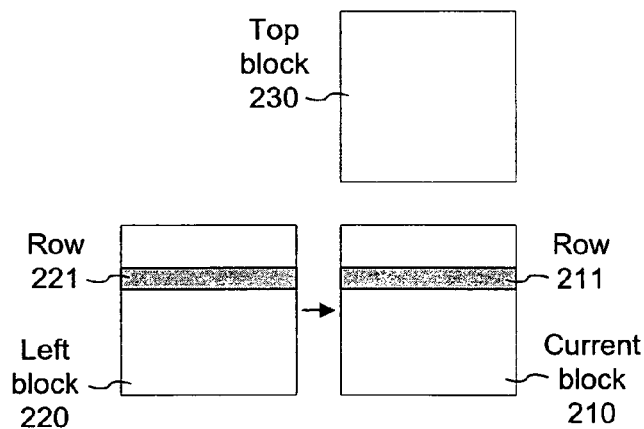
Figure 6, prior art
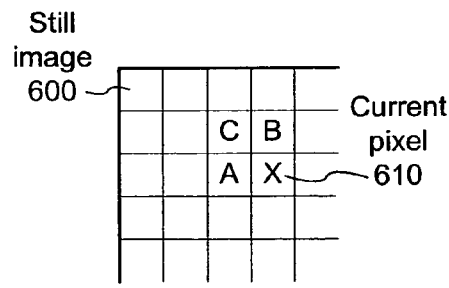

Figure 3, prior art
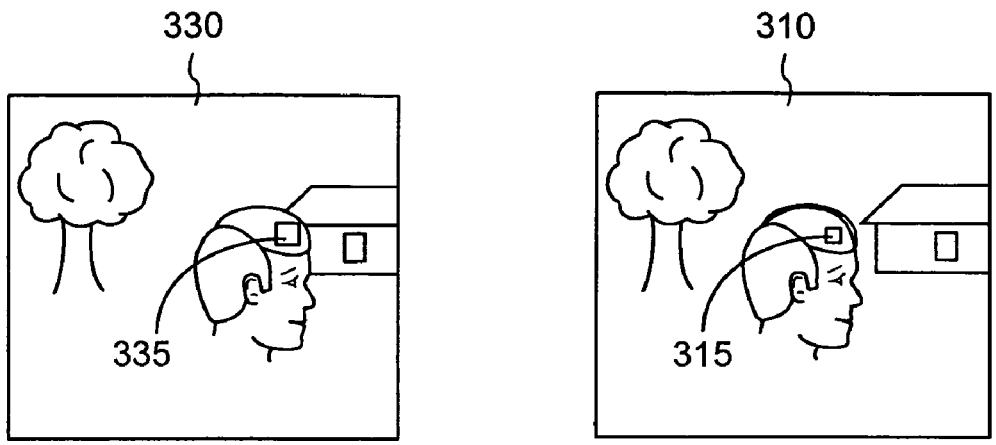
Figure 7
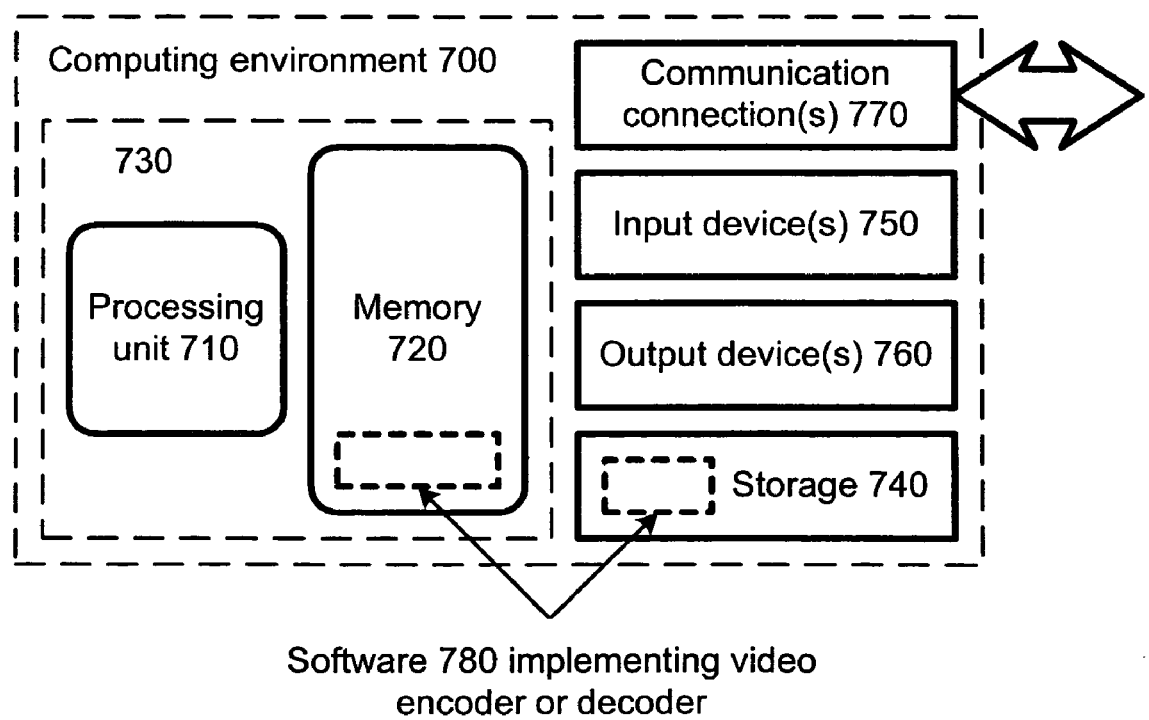

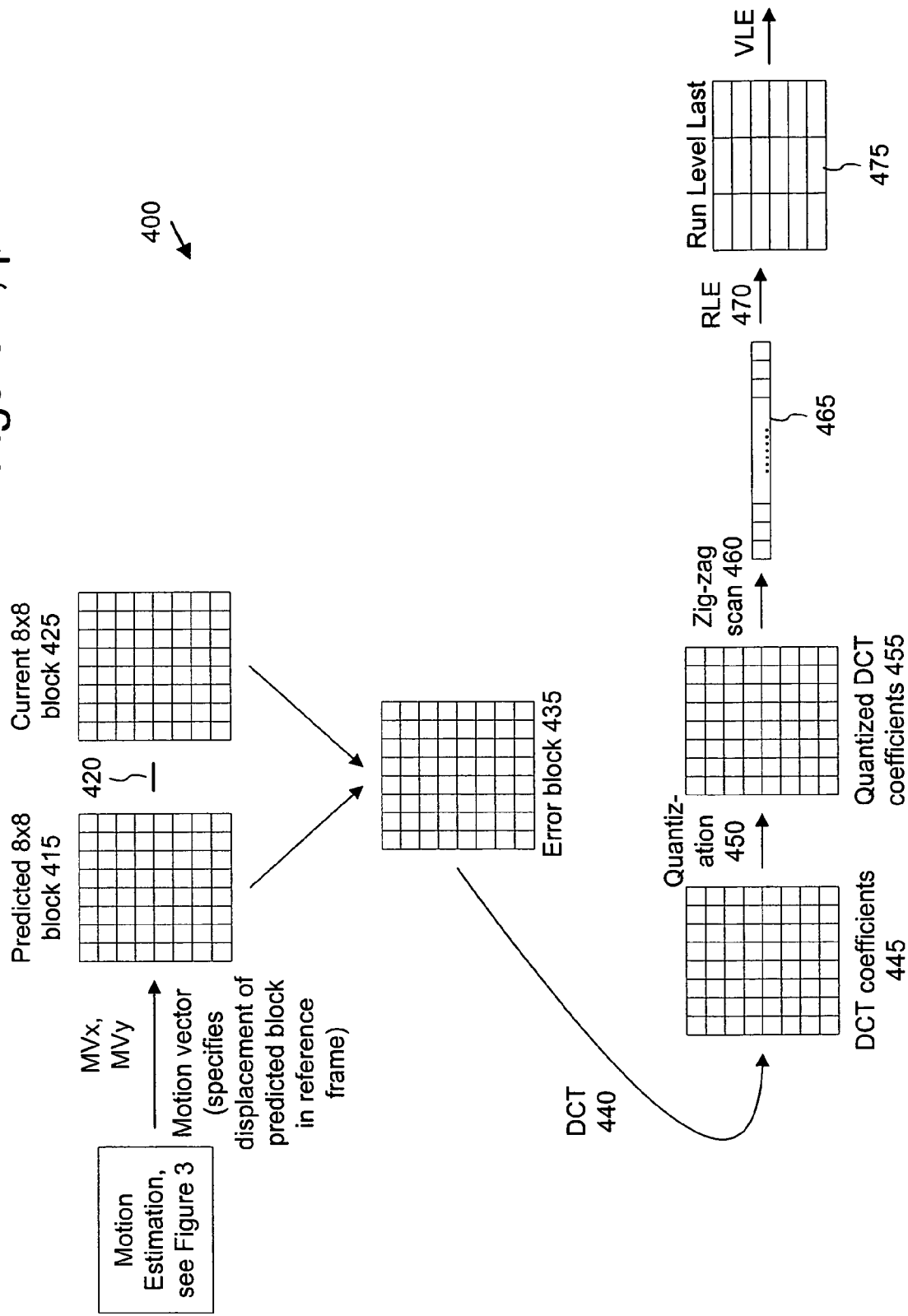
Figure 4, prior art

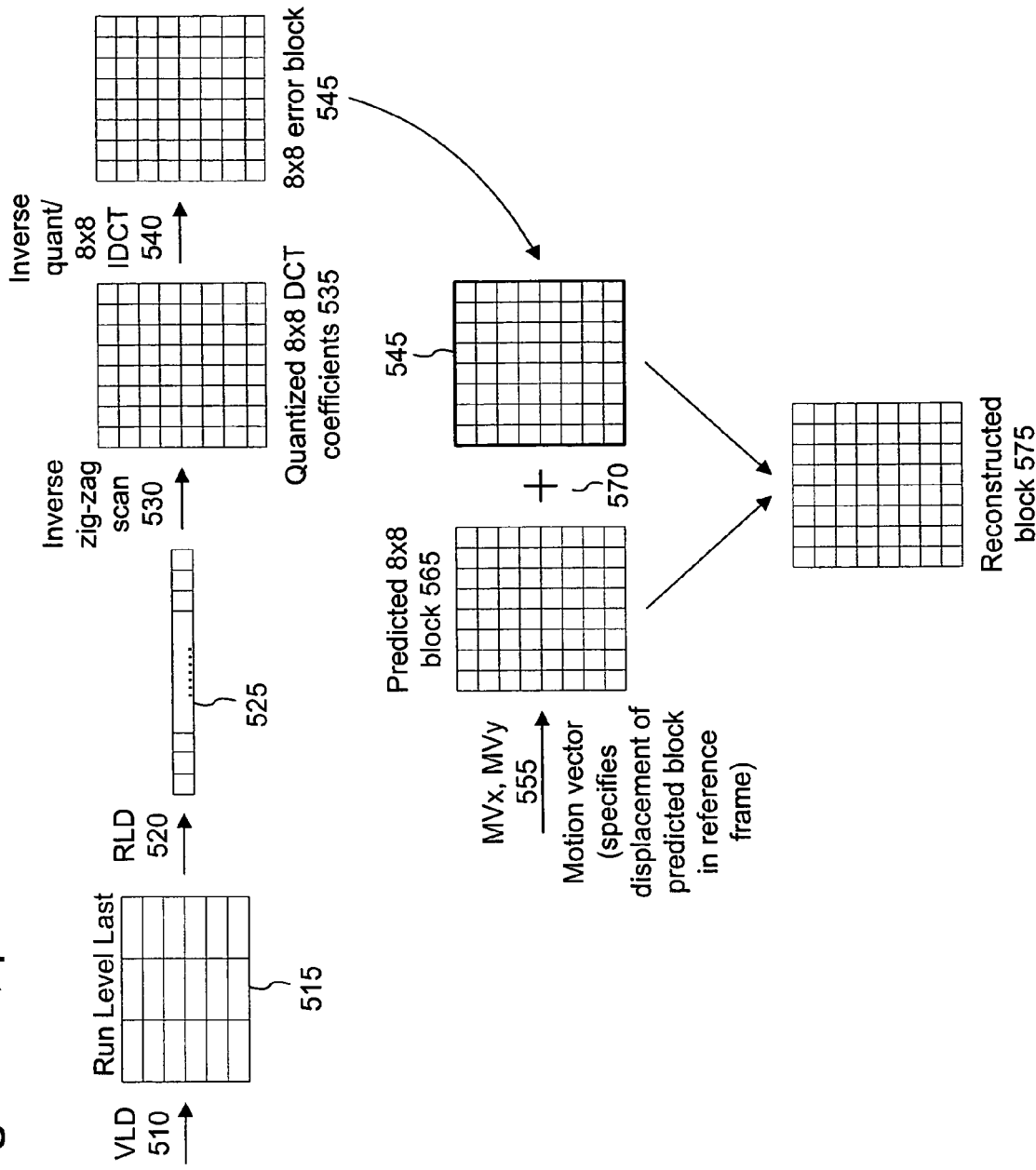
Figure 5, prior art

DC: 1
AC1 through AC7: 0

Reconstructed with regular frequency transform

DC: 1
AC1 through AC7: 0

Reconstructed with re-oriented inverse frequency transform

Figure 15a

*mode = 1:*
    pCurr[i][j] = pTop[(2*i + j + 2 > 15) ? 15 : 2*i + j + 2]
*mode = 2:*
    pCurr[i][j] = pTop[i + j + 1]
*mode = 3:*
    pCurr[i][j] = pTop[floor((i + 1)/2) + j]
*mode = 4:*
    pCurr[i][j] = floor((pTop[j] + pTop[j + 16] + 1)/2)
*mode = 5:*
    if (j >= floor((i - 1)/2))
        pCurr[i][j] = pTop[j − floor((i + 1)/2)]
    else
        pCurr[i][j] = pLeft[i − 1 − 2*j]
*mode = 6:*
    if (j > i)
        pCurr[i][j] = pTop[j − i - 1]
    else
        pCurr[i][j] = pLeft[i − j]
*mode = 7:*
    if (j > 2*i + 1)
        pCurr[i][j] = floor((pTop[j−2*i-2] + pTop[j−2*i−1] + 1)/2)
    else
        pCurr[i][j] = pLeft[floor(j/2) − i]
*mode = 8:*
    pCurr[i][j] = floor((pLeft[i + 1] + pLeft[i + 9] + 1)/2)
*mode = 9:*
    if (i + j < 6)
        pCurr[i][j] = pLeft[i + j + 2]
    else
        pCurr[i][j] = pLeft[8]

*mode = 10: blended horizontal continuity*
    pCurr[i][j] = floor((pLeft[i + 1]*(8 − j) + pTop[j]*j + 4)/8)
*mode = 11: blended vertical continuity*
    pCurr[i][j] = floor((pLeft[i + 1]*i + pTop[j]*(8 − i) + 4)/8)

Figure 15c

```
for (int i = 0; i < 8; i++) {
    int ll = (i < 4) ? 8 : 4 + i;
    sl[0] = sl[1] = st[0] = st[1] = 0;

for (int k = 0; k < ll; k++) {
        int diff = abs(k - i);
        int wt = 4 - (diff >> 1);
        st[diff & 1] += ((int) pTop[k]) << wt;
        if (k < 8)
            sl[diff & 1] += ((int) pLeft[k + 1]) << wt;

k++;
        diff = abs(k - i);
        wt = 4 - (diff >> 1);
        st[diff & 1] += ((int) pTop[k]) << wt;
        if (k < 8)
            sl[diff & 1] += ((int) pLeft[k + 1]) << wt;
    } pTopSum[i]  = st[0] + ((st[1] * 181 + 128) >> 8);
    pLeftSum[i] = sl[0] + ((sl[1] * 181 + 128) >> 8);
}
```

```
pWtsT =
    640  669  708  748  792  760  808  772
    480  537  598  661  719  707  768  745
    354  416  488  564  634  642  716  706
    257  316  388  469  543  571  655  660
    198  250  317  395  469  507  597  616
    161  206  266  340  411  455  548  576
    122  159  211  276  341  389  483  520
    110  144  193  254  317  366  458  499 pWtsL =
    640  480  354  257  198  143  101   72
    669  537  416  316  250  185  134   97
    708  598  488  388  317  241  179  132
    748  661  564  469  395  311  238  180
    792  719  634  543  469  380  299  231
    855  788  710  623  548  455  366  288
    972  914  842  758  682  584  483  390
   1172 1107 1028  932  846  731  611  499
```

```
/* The following data types are defined in the IDCT code:
I16 = 16 bit signed integer
I32 = 32 bit signed integer */

/* The following integer constants are used in the IDCT code */
W1 = 2841
W2 = 2676
W3 = 2408
W5 = 1609
W6 = 1108
W7 = 565

RowIDCT_8Point (I16* input, I16* output)
{
        I32 x0, x1, x2, x3, x4, x5, x6, x7, x8;

x0 = ((I32) input [0] << 11) + 128;
        x1 = (I32) input [4] << 11;
        x2 = input [6];
        x3 = input [2];
        x4 = input [1];
        x5 = input [7];
        x6 = input [5];
        x7 = input [3];

/* first stage */
        x8 = W7 * (x4 + x5);
        x4 = x8 + (W1 - W7) * x4;
        x5 = x8 - (W1 + W7) * x5;
        x8 = W3 * (x6 + x7);
        x6 = x8 - (W3 - W5) * x6;
        x7 = x8 - (W3 + W5) * x7;

/* second stage */
        x8 = x0 + x1;
        x0 = x0 - x1;
        x1 = W6 * (x3 + x2);
        x2 = x1 - (W2 + W6) * x2;
        x3 = x1 + (W2 - W6) * x3;
        x1 = x4 + x6;
        x4 = x4 - x6;
        x6 = x5 + x7;
        x5 = x5 - x7;
```

```
/* third stage */
x7 = x8 + x3;
x8 = x8 – x3;
x3 = x0 + x2;
x0 = x0 – x2;
x2 = (I32) (181 * (x4 + x5) + 128) >> 8;
x4 = (I32) (181 * (x4 - x5) + 128) >> 8;

/* fourth stage */
output [0] = (I16) ((x7 + x1) >> 8);
output [1] = (I16) ((x3 + x2) >> 8);
output [2] = (I16) ((x0 + x4) >> 8);
output [3] = (I16) ((x8 + x6) >> 8);
output [4] = (I16) ((x8 – x6) >> 8);
output [5] = (I16) ((x0 – x4) >> 8);
output [6] = (I16) ((x3 – x2) >> 8);
output [7] = (I16) ((x7 – x1) >> 8);
}

ColumnIDCT_8Point (I16* input, I16* output)
{
    I32 x0, x1, x2, x3, x4, x5, x6, x7, x8;

x0 = ((I32) input [0] << 8) + 8192;
    x1 = (I32) input [4] << 8;
    x2 = input [6];
    x3 = input [2];
    x4 = input [1];
    x5 = input [7];
    x6 = input [5];
    x7 = input [3];

/* first stage */
    x8 = W7 * (x4 + x5) + 4;
    x4 = (x8 + (W1 – W7) * x4) >> 3;
    x5 = (x8 - (W1 + W7) * x5) >> 3;
    x8 = W3 * (x6 + x7) + 4;
    x6 = (x8 – (W3 – W5) * x6) >> 3;
    x7 = (x8 – (W3 + W5) * x7) >> 3;
```

↓
ⓑ

2100

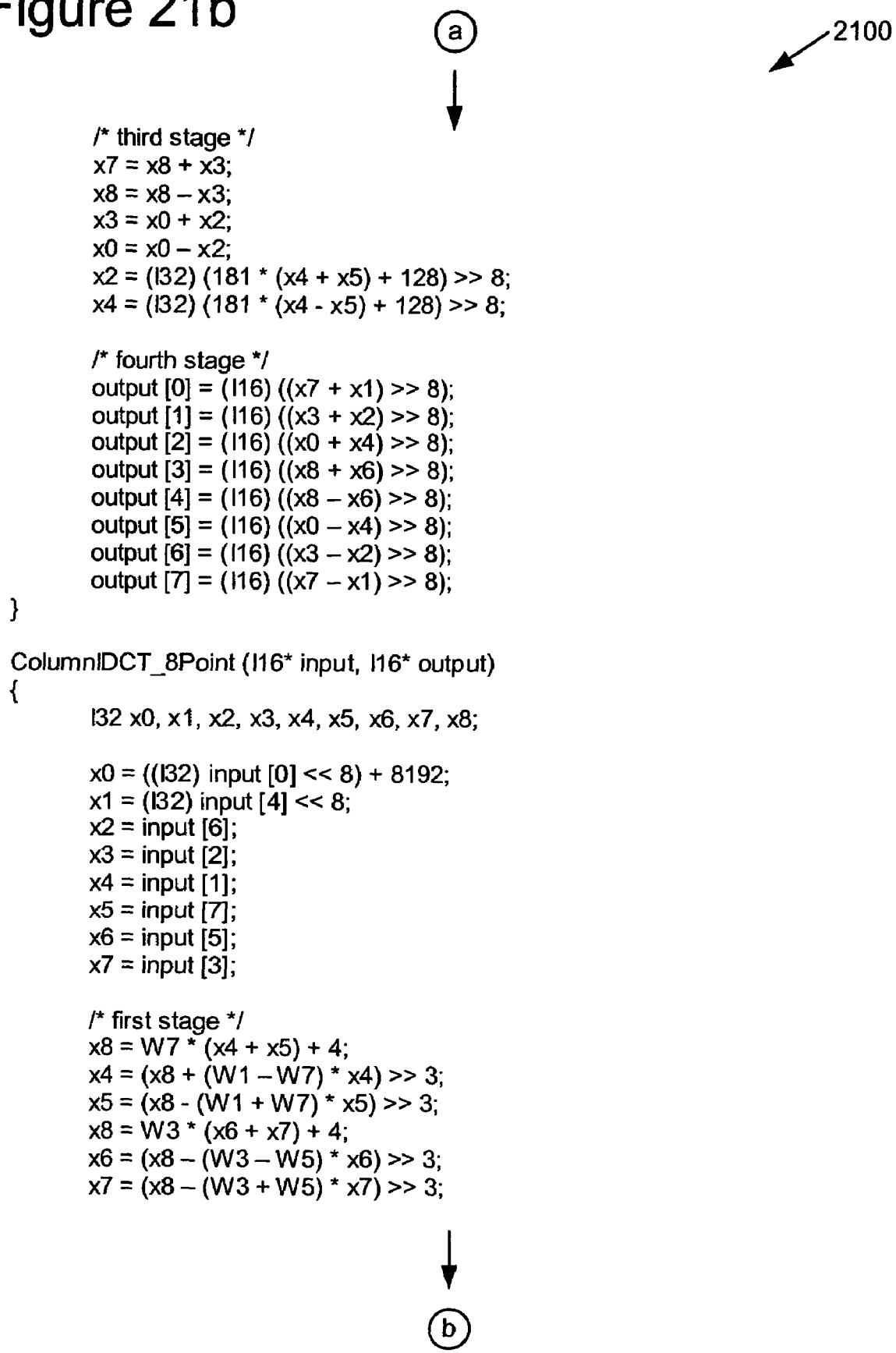

```
/* second stage */
x8 = x0 + x1;
x0 = x0 - x1;
x1 = W6 * (x3 + x2) + 4;
x2 = (x1 - (W2 + W6) * x2) >> 3;
x3 = (x1 + (W2 - W6) * x3) >> 3;
x1 = x4 + x6;
x4 = x4 - x6;
x6 = x5 + x7;
x5 = x5 - x7;

/* third stage */
x7 = x8 + x3;
x8 = x8 - x3;
x3 = x0 + x2;
x0 = x0 - x2;
x2 = (181 * (x4 + x5) + 128) >> 8;
x4 = (181 * (x4 - x5) + 128) >> 8;

/* fourth stage */
output [0] = (I16) ((x7 + x1) >> 14);
output [1] = (I16) ((x3 + x2) >> 14);
output [2] = (I16) ((x0 + x4) >> 14);
output [3] = (I16) ((x8 + x6) >> 14);
output [4] = (I16) ((x8 - x6) >> 14);
output [5] = (I16) ((x0 - x4) >> 14);
output [6] = (I16) ((x3 - x2) >> 14);
output [7] = (I16) ((x7 - x1) >> 14);
```

Figure 22

$$2200 \rightarrow pBwt = \begin{pmatrix} 0 & 3811 & 487 & 506 & 135 & 173 & 61 & 42 \\ 3811 & -1084 & -135 & -135 & -42 & -61 & 0 & 0 \\ 487 & -135 & 0 & 0 & 0 & 0 & 0 & 0 \\ 506 & -135 & 0 & 0 & 0 & 0 & 0 & 0 \\ 135 & -42 & 0 & 0 & -42 & 0 & 0 & 0 \\ 173 & -61 & 0 & 0 & 0 & 0 & 0 & 0 \\ 61 & 0 & 0 & 0 & 0 & 0 & 0 & 0 \\ 42 & 0 & 0 & 0 & 0 & 0 & 0 & 0 \end{pmatrix}$$

Figure 24

```
int gaReconstructionLevels[] = {
    256, 256, 256, 256, 256, 256, 259, 262, 265, 269, 272, 275, 278, 282, 285, 288,
    292, 295, 299, 303, 306, 310, 314, 317, 321, 325, 329, 333, 337, 341, 345, 349,
    353, 358, 362, 366, 371, 375, 379, 384, 389, 393, 398, 403, 408, 413, 417, 422,
    428, 433, 438, 443, 448, 454, 459, 465, 470, 476, 482, 488, 493, 499, 505, 511};
```
(2400)

Figure 26a

| 0 | 2 | 3 | 9 | 10 | 21 | 22 | 36 |
|---|---|---|---|----|----|----|----|
| 1 | 4 | 8 | 11 | 20 | 23 | 35 | 37 |
| 5 | 7 | 12 | 19 | 24 | 34 | 38 | 49 |
| 6 | 13 | 18 | 25 | 33 | 39 | 48 | 50 |
| 14 | 16 | 26 | 32 | 40 | 47 | 51 | 58 |
| 15 | 27 | 31 | 41 | 46 | 52 | 57 | 59 |
| 17 | 29 | 42 | 44 | 53 | 55 | 60 | 62 |
| 28 | 30 | 43 | 45 | 54 | 56 | 61 | 63 |

| 0 | 1 | 3 | 4 | 10 | 11 | 22 | 23 |
|---|---|---|---|----|----|----|----|
| 2 | 5 | 9 | 12 | 21 | 24 | 36 | 37 |
| 6 | 8 | 13 | 20 | 25 | 35 | 38 | 48 |
| 7 | 14 | 19 | 26 | 34 | 39 | 47 | 49 |
| 15 | 18 | 27 | 33 | 40 | 46 | 50 | 57 |
| 16 | 28 | 32 | 41 | 45 | 51 | 56 | 58 |
| 17 | 30 | 42 | 44 | 52 | 55 | 59 | 62 |
| 29 | 31 | 43 | 53 | 54 | 60 | 61 | 63 |

| 0 | 3 | 8 | 9 | 20 | 21 | 34 | 35 |
|---|---|---|---|----|----|----|----|
| 1 | 7 | 10 | 19 | 22 | 33 | 36 | 49 |
| 2 | 11 | 18 | 23 | 32 | 37 | 48 | 50 |
| 4 | 12 | 17 | 24 | 31 | 38 | 47 | 51 |
| 5 | 16 | 25 | 30 | 39 | 46 | 52 | 57 |
| 6 | 15 | 29 | 40 | 45 | 53 | 56 | 58 |
| 13 | 26 | 28 | 41 | 44 | 55 | 59 | 62 |
| 14 | 27 | 42 | 43 | 54 | 60 | 61 | 63 |

2603

SPATIAL EXTRAPOLATION OF PIXEL VALUES IN INTRAFRAME VIDEO CODING AND DECODING

RELATED APPLICATION INFORMATION

The present application is a continuation of U.S. patent application Ser. No. 10/322,171, entitled "Spatial Extrapolation of Pixel Values in Intraframe Video Coding and Decoding," filed Dec. 17, 2002 now U.S. Pat. No. 7,116,830, the disclosure of which is incorporated by reference, which claims the benefit of U.S. Provisional Patent Application Ser. No. 60/341,674, entitled "Techniques and Tools for Video Encoding and Decoding," filed Dec. 17, 2001, the disclosure of which is incorporated by reference. The following U.S. patent applications relate to the present application: 1) U.S. patent application Ser. No. 10/322,383, entitled, "Motion Compensation Loop With Filtering," filed Dec. 17, 2002, now U.S. Pat. No. 7,120,197; 2) U.S. patent application Ser. No. 10/322,351, entitled, "Multi-Resolution Motion Estimation and Compensation," filed Dec. 17, 2002; and 3) U.S. patent application Ser. No. 10/322,352, entitled, "Sub-Block Transform Coding of Prediction Residuals," filed Dec. 17, 2002, now U.S. Pat. No. 7,266,149.

TECHNICAL FIELD

Techniques and tools for spatial extrapolation of pixel values in intraframe video encoding and/or decoding are described. For example, to predict the pixel values for a block of pixels, a video encoder or decoder uses spatial extrapolation from the pixel values of pixels in a causal neighborhood for the block of pixels.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bitrate, of a typical raw digital video sequence can be 5 million bits/second or more.

Most computers and computer networks lack the resources to process raw digital video. For this reason, engineers use compression (also called coding or encoding) to reduce the bitrate of digital video. Compression can be lossless, in which quality of the video does not suffer but decreases in bitrate are limited by the complexity of the video. Or, compression can be lossy, in which quality of the video suffers but decreases in bitrate are more dramatic. Decompression reverses compression.

In general, video compression techniques include intraframe compression and interframe compression. Intraframe compression techniques compress individual frames, typically called I-frames, or key frames. Interframe compression techniques compress frames with reference to preceding and/or following frames, and are called typically called predicted frames, P-frames, or B-frames.

Microsoft Corporation's Windows Media Video, Version 7 ["WMV7"] includes a video encoder and a video decoder. The WMV7 encoder uses intraframe and interframe compression, and the WMV7 decoder uses intraframe and interframe decompression.

A. Intraframe Compression in WMV7

FIG. 1 illustrates block-based intraframe compression (100) of a block (105) of pixels in a key frame in the WMV7 encoder. A block is a set of pixels, for example, an 8×8 arrangement of pixels. The WMV7 encoder splits a key video frame into 8×8 blocks of pixels and applies an 8×8 Discrete Cosine Transform ["DCT"] (110) to individual blocks such as the block (105). A DCT is a type of frequency transform that converts the 8×8 block of pixels (spatial information) into an 8×8 block of DCT coefficients (115), which are frequency information. The DCT operation itself is lossless or nearly lossless. Compared to the original pixel values, however, the DCT coefficients are more efficient for the encoder to compress since most of the significant information is concentrated in low frequency coefficients (conventionally, the upper left of the block (115)) and many of the high frequency coefficients (conventionally, the lower right of the block (115)) have values of zero or close to zero.

The encoder then quantizes (120) the DCT coefficients, resulting in an 8×8 block of quantized DCT coefficients (125). For example, the encoder applies a uniform, scalar quantization step size to each coefficient, which is analogous to dividing each coefficient by the same value and rounding. For example, if a DCT coefficient value is 163 and the step size is 10, the quantized DCT coefficient value is 16. Quantization is lossy. The reconstructed DCT coefficient value will be 160, not 163. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients (125) for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient (126) as a differential from the DC coefficient (136) of a neighboring 8×8 block, which is a previously encoded neighbor (e.g., top or left) of the block being encoded. (FIG. 1 shows a neighbor block (135) that is situated to the left of the block being encoded in the frame.) The encoder entropy encodes (140) the differential.

The entropy encoder can encode the left column or top row of AC coefficients as a differential from a corresponding column or row of the neighboring 8×8 block. FIG. 1 shows the left column (127) of AC coefficients encoded as a differential (147) from the left column (137) of the neighboring (to the left) block (135). The differential coding increases the chance that the differential coefficients have zero values. The remaining AC coefficients are from the block (125) of quantized DCT coefficients.

The encoder scans (150) the 8×8 block (145) of predicted, quantized AC DCT coefficients into a one-dimensional array (155) and then entropy encodes the scanned AC coefficients using a variation of run length coding (160). The encoder selects an entropy code from one or more run/level/last tables (165) and outputs the entropy code.

A key frame contributes much more to bitrate than a predicted frame. In low or mid-bitrate applications, key frames are often critical bottlenecks for performance, so efficient compression of key frames is critical.

FIG. 2 illustrates a disadvantage of intraframe compression such as shown in FIG. 1. In particular, exploitation of redundancy between blocks of the key frame is limited to prediction of a subset of frequency coefficients (e.g., the DC coefficient and the left column (or top row) of AC coefficients) from the left (220) or top (230) neighboring block of a block (210). The DC coefficient represents the average of the block, the left column of AC coefficients represents the averages of the rows of a block, and the top row represents the averages of the columns. In effect, prediction of DC and AC coefficients as in WMV7 limits extrapolation to the row-wise (or column-wise) average signals of the left (or top) neighboring block. For a particular row (221) in the left block (220), the AC coefficients in the left DCT coefficient column for the left block (220) are used to predict the entire corresponding row (211) of the block (210). The disadvantages of this prediction include:

1) Since the prediction is based on averages, the far edge of the neighboring block has the same influence on the predictor as the adjacent edge of the neighboring block, whereas intuitively the far edge should have a smaller influence.
2) Only the average pixel value across the row (or column) is extrapolated.
3) Diagonally oriented edges or lines that propagate from either predicting block (top or left) to the current block are not predicted adequately.
4) When the predicting block is to the left, there is no enforcement of continuity between the last row of the top block and the first row of the extrapolated block.

B. Interframe Compression in WMV7

Interframe compression in the WMV7 encoder uses block-based motion compensated prediction coding followed by transform coding of the residual error. FIGS. 3 and 4 illustrate the block-based interframe compression for a predicted frame in the WMV7 encoder. In particular, FIG. 3 illustrates motion estimation for a predicted frame (310) and FIG. 4 illustrates compression of a prediction residual for a motion-estimated block of a predicted frame.

The WMV7 encoder splits a predicted frame into 8×8 blocks of pixels. Groups of 4 8×8 blocks form macroblocks. For each macroblock, a motion estimation process is performed. The motion estimation approximates the motion of the macroblock of pixels relative to a reference frame, for example, a previously coded, preceding frame. In FIG. 3, the WMV7 encoder computes a motion vector for a macroblock (315) in the predicted frame (310). To compute the motion vector, the encoder searches in a search area (335) of a reference frame (330). Within the search area (335), the encoder compares the macroblock (315) from the predicted frame (310) to various candidate macroblocks in order to find a candidate macroblock that is a good match. The encoder can check candidate macroblocks every pixel or every ½ pixel in the search area (335), depending on the desired motion estimation resolution for the encoder. Other video encoders check at other increments, for example, every ¼ pixel. For a candidate macroblock, the encoder checks the difference between the macroblock (315) of the predicted frame (310) and the candidate macroblock and the cost of encoding the motion vector for that macroblock. After the encoder finds a good matching macroblock, the block matching process ends. The encoder outputs the motion vector (entropy coded) for the matching macroblock so the decoder can find the matching macroblock during decoding. When decoding the predicted frame (310), a decoder uses the motion vector to compute a prediction macroblock for the macroblock (315) using information from the reference frame (330). The prediction for the macroblock (315) is rarely perfect, so the encoder usually encodes 8×8 blocks of pixel differences (also called the error or residual blocks) between the prediction macroblock and the macroblock (315) itself.

Motion estimation and compensation are effective compression techniques, but various previous motion estimation/compensation techniques (as in WMV7 and elsewhere) have several disadvantages, including:

1) The resolution of the motion estimation (i.e., pixel, ½ pixel, ¼ pixel increments) does not adapt to the video source. For example, for different qualities of video source (clean vs. noisy), the video encoder uses the same resolution of motion estimation, which can hurt compression efficiency.
2) For ¼ pixel motion estimation, the search strategy fails to adequately exploit previously completed computations to speed up searching.
3) For ¼ pixel motion estimation, the search range is too large and inefficient. In particular, the horizontal resolution is the same as the vertical resolution in the search range, which does not match the motion characteristics of many video signals.
4) For ¼ pixel motion estimation, the representation of motion vectors is inefficient to the extent bit allocation for horizontal movement is the same as bit allocation for vertical resolution.

FIG. 4 illustrates the computation and encoding of an error block (435) for a motion-estimated block in the WMV7 encoder. The error block (435) is the difference between the predicted block (415) and the original current block (425). The encoder applies a DCT (440) to error block (435), resulting in 8×8 block (445) of coefficients. Even more than was the case with DCT coefficients for pixel values, the significant information for the error block (435) is concentrated in low frequency coefficients (conventionally, the upper left of the block (445)) and many of the high frequency coefficients have values of zero or close to zero (conventionally, the lower right of the block (445)).

The encoder then quantizes (450) the DCT coefficients, resulting in an 8×8 block of quantized DCT coefficients (455). The quantization step size is adjustable. Again, since low frequency DCT coefficients tend to have higher values, quantization results in loss of precision, but not complete loss of the information for the coefficients. On the other hand, since high frequency DCT coefficients tend to have values of zero or close to zero, quantization of the high frequency coefficients results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block (455) of quantized DCT coefficients for entropy encoding. The encoder scans (460) the 8×8 block (455) into a one dimensional array (465) with 64 elements, such that coefficients are generally ordered from lowest frequency to highest frequency, which typical creates long runs of zero values.

The encoder entropy encodes the scanned coefficients using a variation of run length coding (470). The encoder selects an entropy code from one or more run/level/last tables (475) and outputs the entropy code.

FIG. 5 shows the decoding process (500) for an inter-coded block. Due to the quantization of the DCT coefficients, the reconstructed block (575) is not identical to the corresponding original block. The compression is lossy.

In summary of FIG. 5, a decoder decodes (510, 520) entropy-coded information representing a prediction residual using variable length decoding and one or more run/level/last tables (515). The decoder inverse scans (530) a one-dimensional array (525) storing the entropy-decoded information into a two-dimensional block (535). The decoder inverse quantizes and inverse discrete cosine transforms (together, 540) the data, resulting in a reconstructed error block (545). In a separate path, the decoder computes a predicted block (565) using motion vector information (555) for displacement from a reference frame. The decoder combines (570) the predicted block (555) with the reconstructed error block (545) to form the reconstructed block (575).

The amount of change between the original and reconstructed frame is termed the distortion and the number of bits required to code the frame is termed the rate. The amount of distortion is roughly inversely proportional to the rate. In other words, coding a frame with fewer bits (greater compression) will result in greater distortion and vice versa. One of the goals of a video compression scheme is to try to improve the rate-distortion—in other words to try to achieve the same distortion using fewer bits (or the same bits and lower distortion).

Compression of prediction residuals as in WMV7 can dramatically reduce bitrate while slightly or moderately affecting quality, but the compression technique is less than optimal in some circumstances. The size of the frequency transform is the size of the prediction residual block (e.g., an 8×8 DCT for an 8×8 prediction residual). In some circumstances, this fails to exploit localization of error within the prediction residual block.

C. Post-Processing with a Deblocking Filter in WMV7

For block-based video compression and decompression, quantization and other lossy processing stages introduce distortion that commonly shows up as blocky artifacts—perceptible discontinuities between blocks.

To reduce the perceptibility of blocky artifacts, the WMV7 decoder can process reconstructed frames with a deblocking filter. The deblocking filter smoothes the boundaries between blocks.

While the deblocking filter in WMV7 improves perceived video quality, it has several disadvantages. For example, the smoothing occurs only on reconstructed output in the decoder. Therefore, prediction processes such as motion estimation cannot take advantage of the smoothing. Moreover, the smoothing by the post-processing filter can be too extreme.

D. Standards for Image and Video Compression and Decompression

Aside from WMV7, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV7, these standards use a combination of intraframe and interframe compression, although the standards typically differ from WMV7 in the details of the compression techniques used. For additional detail about the standards, see the standards' specifications themselves.

In addition, several international standards relate to still image compression and decompression, for example, the standards specified by the Joint Photographic Experts Group ["JPEG"]. These standards use intraframe compression to compress a single image, but typically differ from WMV7 in the details of the compression techniques used for the intraframe compression. For additional detail about the standards, see the standards' specifications themselves.

In particular, the JPEG standard includes a "lossless mode" that uses predictive coding (not just block-based DCT operations as used in other modes). FIG. 6 illustrates the predictive coding of the JPEG lossless mode. For the predictive coding, an encoder computes predictors for individual pixels within a still image (600). For example, for a current pixel X (610), the encoder computes a predictor using the pixel values of up to three neighboring pixels A, B, and C. Table 1 shows seven different predictors used in the JPEG lossless mode.

TABLE 1

Predictor Modes in JPEG Lossless Mode

| Predictor Mode | Prediction |
| --- | --- |
| 1 | A |
| 2 | B |
| 3 | C |
| 4 | A + B − C |
| 5 | A + (B − C)/2 |
| 6 | B + (A − C)/2 |
| 7 | (A + B)/2 |

The encoder then compares the predictor with the actual value for the current pixel X (610) and encodes the difference losslessly. Pixels in the first row use the predictor 1, and pixels in the first column use the predictor 2. For additional information about JPEG lossless mode, see the relevant sections of the JPEG standard as codified by the ITU: ITU-T T.81 "Information Technology-Digital Compression and Coding of Continuous-Tone Still Images-Requirements and Guidelines (1992).

While JPEG lossless mode has some advantages, the overall compression ratio for JPEG lossless mode is not good in many cases. In addition, since JPEG lossless mode works on a pixel-by-pixel basis, it does not easily integrate with some block-based coding schemes.

Given the critical importance of video compression and decompression to digital video, it is not surprising that image and video compression and decompression are richly developed fields. Whatever the benefits of previous image and video compression and decompression techniques, however, they do not have the advantages of the following techniques and tools.

SUMMARY

In summary, the detailed description is directed to various techniques and tools for spatial extrapolation of pixel values in intraframe video encoding and decoding. Spatial extrapolation of pixel values in intraframe video encoding and decoding addresses several of the disadvantages of intraframe compression according to the prior art, improving the efficiency of the intraframe encoding and decoding. The various techniques and tools can be used in combination or independently.

According to a first set of techniques and tools, a video encoder encodes a block of pixels in a frame using spatial extrapolation from pixels in one or more neighboring blocks in the frame, which improves the efficiency of intraframe coding. The video encoder selects the orientation of the extrapolation from any of multiple available directions. For example, for a current block in a frame, the video encoder extrapolates from sets of values within blocks to the left, top-left, and/or top according to one of thirteen extrapolation patterns, which include horizontal, vertical, and diagonal orientations. A video decoder decodes the block of pixels by extrapolating from the pixels in neighboring blocks in the frame according to the extrapolation mode of the extrapolation used in the encoder.

According to a second set of techniques and tools, a video encoder predicts the extrapolation mode of a current block from the known extrapolation modes of neighboring blocks to improve coding efficiency. Prediction of extrapolation orientation can speed up selection of the extrapolation mode and/or reduce the average number of bits spent encoding the extrapolation mode. For example, a video encoder predicts the extrapolation mode of a current block based upon generalizations of the extrapolation modes of the top and left blocks. Starting from the predicted orientation, the encoder checks possible extrapolation orientations in a ranked order associated with the predicted extrapolation mode. The encoder finds a satisfactory orientation faster than with a full search through all available orientations. Moreover, the encoder uses short variable length codes for early indices in the ranked order and long variable length codes for later indices in the ranked order to reduce the average bits spent encoding the indices. Or, the encoder spends no bits encoding an extrapolation mode if the current block uses a predicted extrapolation mode or an orientation that the decoder will otherwise deduce from contextual information in the neighboring blocks in decoding. A video decoder predicts the extrapolation mode of a current block from the known orientations of neighboring blocks when reconstructing the current block, which improves decoding efficiency. For example, the decoder decodes a variable length code for the index in a ranked order associated with the predicted extrapolation mode of the current block and determines the actual extrapolation mode. Or, the decoder determines extrapolation orientation for the current block based upon contextual information in the neighboring blocks, without a variable length code for the mode of the current block.

According to a third set of techniques and tools, a video encoder uses a re-oriented frequency transform to address non-stationarity in the prediction residual of a spatially extrapolated current block of pixels. In general, spatial extrapolation for a current block yields more accurate values close to neighboring block(s) from which values are extrapolated into the current block. As a result, the prediction residual is more significant (e.g., higher variance) further from the neighboring block(s). The video encoder addresses this non-stationarity with the re-oriented frequency transform. For example, for a block of DCT coefficients, the video encoder lifts one of more AC coefficients as a function of the DC coefficient to compensate for the non-stationarity, which increases energy compaction in the prediction residual. A video decoder also addresses the non-stationarity in the prediction residual. For example, the decoder applies a re-oriented inverse DCT and compensates for the non-orthogonality by inverse lifting selected AC coefficients. In various circumstances, the video encoder can disable the re-oriented frequency transform (using the ordinary frequency transform instead), and the decoder can do the same for the inverse transform, based upon contextual information.

According to a fourth set of techniques and tools, depending on the extrapolation orientation for a current block, a video encoder selects from among plural available scan patterns for converting the frequency coefficients for a prediction residual into a one-dimensional array for entropy encoding, which improves entropy encoding efficiency. For example, a video encoder selects a scan pattern for a generalization of the extrapolation orientation, and the scan pattern decreases entropy in the one-dimensional array for subsequent run-level encoding. Depending on the extrapolation orientation for a current block, a video decoder selects from among plural available scan patterns for converting a one-dimensional array of values into frequency coefficients of a prediction residual.

According to a fifth set of techniques and tools, depending on contextual information in neighboring blocks, a video encoder selects or switches an entropy encoding table from among plural available entropy encoding tables for a spatially extrapolated current block. For example, based upon the minimum number of non-zero values among neighboring blocks of a current block, the encoder selects among available entropy encoding tables for encoding a DC frequency coefficient, and the encoder switches between available entropy encoding tables during encoding of AC frequency coefficients. Depending on contextual information in neighboring blocks, a video decoder selects or switches an entropy decoding table from among plural entropy decoding tables, for example, based upon the minimum number of non-zero values among neighboring blocks of a current block.

According to a sixth set of techniques and tools, a video encoder processes reconstructed blocks within a spatial extrapolation loop to reduce block boundaries, which improves the quality of spatial extrapolation for subsequent blocks in the frame. For example, a video encoder processes one or more rows or columns of a reconstructed neighboring block to reduce discontinuities between the reconstructed current block and reconstructed neighboring blocks. A video decoder also processes reconstructed blocks within a spatial extrapolation loop to reduce block boundaries.

Additional features and advantages will be made apparent from the following detailed description of different embodiments that proceeds with reference to the accompanying drawings.

BRIEF DESCRIPTION OF THE DRAWINGS

FIG. 1 is a diagram showing block-based intraframe compression of an 8×8 block of pixels according to prior art.

FIG. 2 is a diagram showing prediction of frequency coefficients according to the prior art.

FIG. 3 is a diagram showing motion estimation in a video encoder according to the prior art.

FIG. 4 is a diagram showing block-based interframe compression for an 8×8 block of prediction residuals in a video encoder according to the prior art.

FIG. 5 is a diagram showing block-based interframe decompression for an 8×8 block of prediction residuals according to the prior art.

FIG. 6 is a chart showing predictive coding in JPEG lossless mode according to the prior art.

FIG. 7 is a block diagram of a suitable computing environment in which several described embodiments may be implemented.

FIGS. 15a and 15b are code listings showing pseudocode for various extrapolation modes that reference the neighboring values of FIG. 12, as used in spatial extrapolation for a block of pixels.

FIGS. 15*c* and 15*d* show pseudocode and weights used for the bi-directional extrapolation mode.

FIGS. 21*a*-21*c* are code listings showing pseudocode for 8-point IDCT operations for rows and columns in one implementation.

FIG. 22 is a chart showing weights used in a skewed inverse DCT.

FIG. 24 is a chart showing weights used in non-flat quantization and dequantization of frequency coefficients.

FIGS. 26*a*-26*c* are charts showing different scan patterns for scanning residual block values into a one-dimensional array in one implementation.

DETAILED DESCRIPTION

Figure 8:
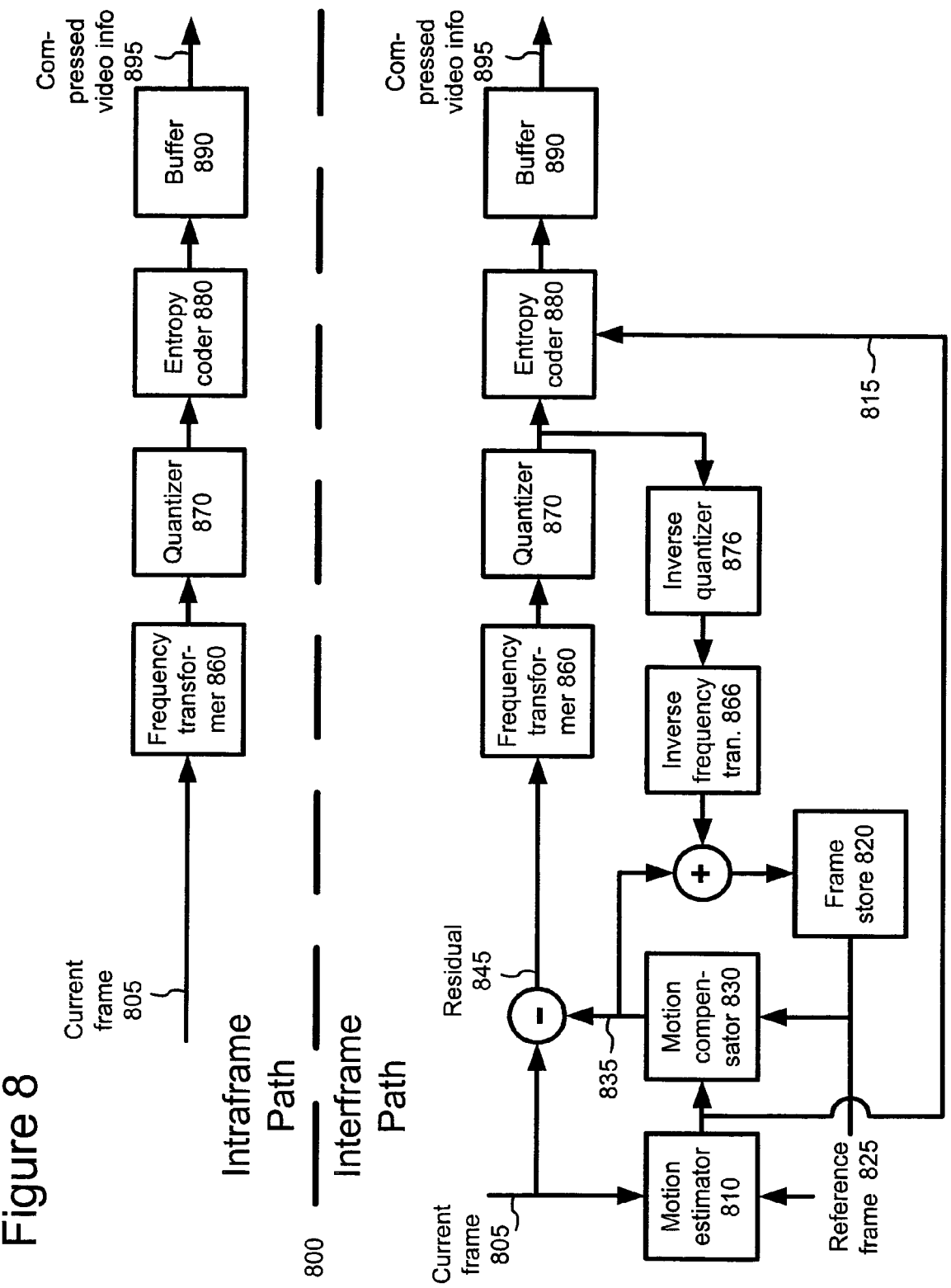
FIG. 8 is a block diagram of a generalized video encoder system used in several described embodiments.

The present application relates to techniques and tools for video encoding and decoding. In various described embodiments, a video encoder incorporates techniques that improve the efficiency of intraframe coding, a video decoder incorporates techniques that improve the efficiency of intraframe decoding, and a bitstream format includes flags and other codes to incorporate the techniques.

The various techniques and tools can be used in combination or independently. Different embodiments implement one or more of the described techniques and tools.

I. Computing Environment

FIG. 7 illustrates a generalized example of a suitable computing environment (700) in which several of the described embodiments may be implemented. The computing environment (700) is not intended to suggest any limitation as to scope of use or functionality, as the techniques and tools may be implemented in diverse general-purpose or special-purpose computing environments.

With reference to FIG. 7, the computing environment (700) includes at least one processing unit (710) and memory (720). In FIG. 7, this most basic configuration (730) is included within a dashed line. The processing unit (710) executes computer-executable instructions and may be a real or a virtual processor. In a multi-processing system, multiple processing units execute computer-executable instructions to increase processing power. The memory (720) may be volatile memory (e.g., registers, cache, RAM), non-volatile memory (e.g., ROM, EEPROM, flash memory, etc.), or some combination of the two. The memory (720) stores software (780) implementing a video encoder or decoder.

A computing environment may have additional features. For example, the computing environment (700) includes storage (740), one or more input devices (750), one or more output devices (760), and one or more communication connections (770). An interconnection mechanism (not shown) such as a bus, controller, or network interconnects the components of the computing environment (700). Typically, operating system software (not shown) provides an operating environment for other software executing in the computing environment (700), and coordinates activities of the components of the computing environment (700).

The storage (740) may be removable or non-removable, and includes magnetic disks, magnetic tapes or cassettes, CD-ROMs, DVDs, or any other medium which can be used to store information and which can be accessed within the computing environment (700). The storage (740) stores instructions for the software (780) implementing the video encoder or decoder.

The input device(s) (750) may be a touch input device such as a keyboard, mouse, pen, or trackball, a voice input device, a scanning device, or another device that provides input to the computing environment (700). For audio or video encoding, the input device(s) (750) may be a sound card, video card, TV tuner card, or similar device that accepts audio or video input in analog or digital form, or a CD-ROM or CD-RW that reads audio or video samples into the computing environment (700). The output device(s) (760) may be a display, printer, speaker, CD-writer, or another device that provides output from the computing environment (700).

The communication connection(s) (770) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (700), computer-readable media include memory (720), storage (740), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "select," "adjust," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

Figure 9:
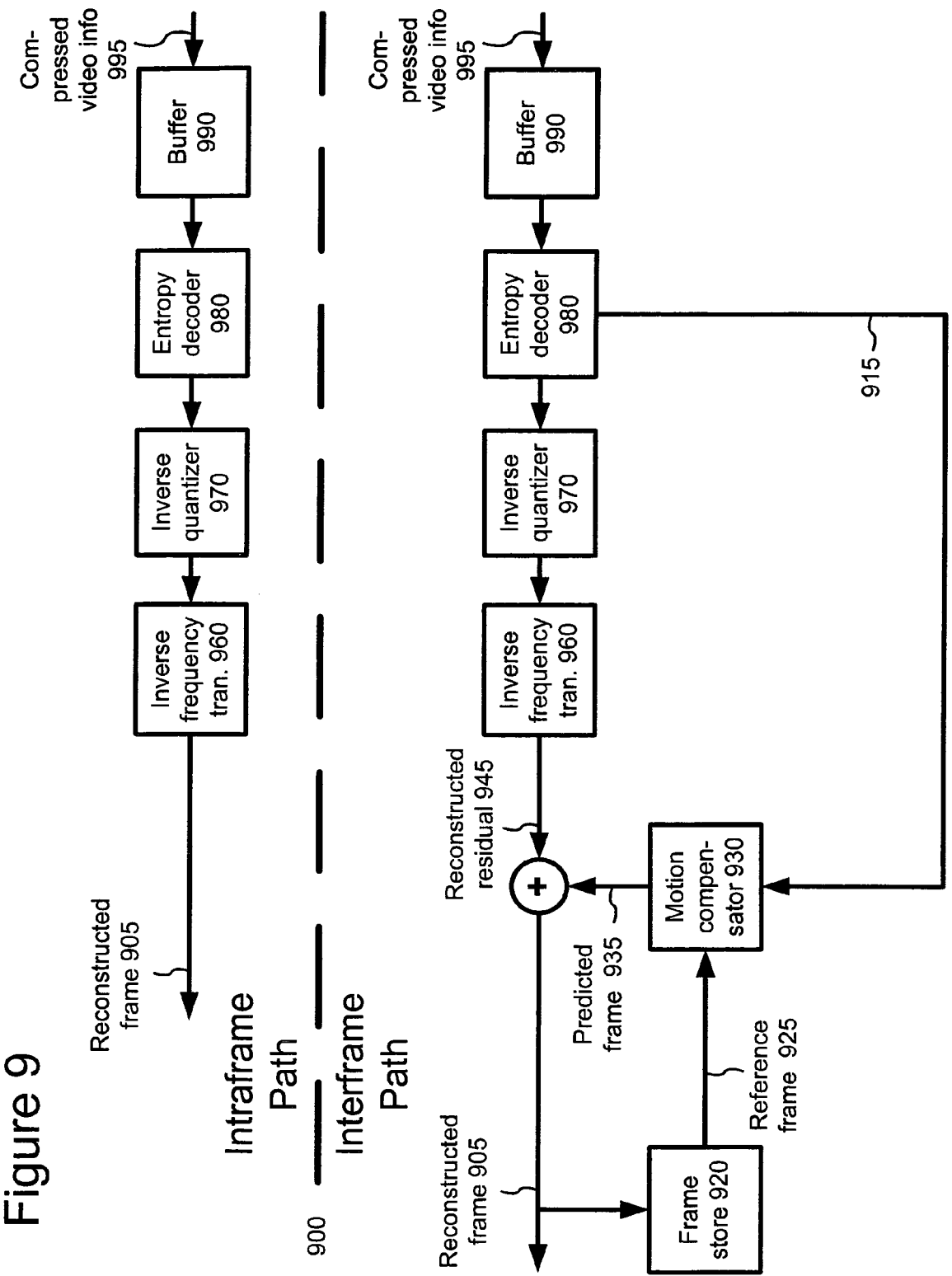
FIG. 9 is a block diagram of a generalized video decoder system used in several described embodiments.

FIG. 8 is a block diagram of a generalized video encoder (800) and FIG. 9 is a block diagram of a generalized video decoder (900).

The relationships shown between modules within the encoder and decoder indicate the main flow of information in the encoder and decoder; other relationships are not shown for the sake of simplicity. In particular, FIGS. 8 and 9 usually do not show side information indicating the encoder settings, modes, tables, etc. used for a video sequence, frame, macroblock, block, etc. Such side information is sent in the output bitstream, typically after entropy encoding of the side information. The format of the output bitstream can be Windows Media Video version 8 format or another format.

The encoder (800) and decoder (900) are block-based and use a 4:2:0 macroblock format with each macroblock including 4 luminance 8×8 luminance blocks (at times treated as one 16×16 macroblock) and two 8×8 chrominance blocks. Alternatively, the encoder (800) and decoder (900) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 8 is a block diagram of a general video encoder system (800). The encoder system (800) receives a sequence of video frames including a current frame (805), and produces compressed video information (895) as output. Particular embodiments of video encoders typically use a variation or supplemented version of the generalized encoder (800).

The encoder system (800) compresses predicted frames and key frames. For the sake of presentation, FIG. 8 shows a path for key frames through the encoder system (800) and a path for forward-predicted frames. Many of the components of the encoder system (800) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (805) is a forward-predicted frame, a motion estimator (810) estimates motion of macroblocks or other sets of pixels of the current frame (805) with respect to a reference frame, which is the reconstructed previous frame (825) buffered in the frame store (820). In alternative embodiments, the reference frame is a later frame or the current frame is bi-directionally predicted. The motion estimator (810) can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator (810) outputs as side information motion information (815) such as motion vectors. A motion compensator (830) applies the motion information (815) to the reconstructed previous frame (825) to form a motion-compensated current frame (835). The prediction is rarely perfect, however, and the difference between the motion-compensated current frame (835) and the original current frame (805) is the prediction residual (845). Alternatively, a motion estimator and motion compensator apply another type of motion estimation/compensation.

A frequency transformer (860) converts the spatial domain video information into frequency domain (i.e., spectral) data. For block-based video frames, the frequency transformer (860) applies a discrete cosine transform ["DCT"] or variant of DCT to blocks of the pixel data or prediction residual data, producing blocks of DCT coefficients. Alternatively, the frequency transformer (860) applies another conventional frequency transform such as a Fourier transform or uses wavelet or subband analysis. In embodiments in which the encoder uses spatial extrapolation (not shown in FIG. 8) to encode blocks of key frames, the frequency transformer (860) can apply a re-oriented frequency transform such as a skewed DCT to blocks of prediction residuals for the key frame. In other embodiments, the frequency transformer (860) applies an 8×8, 8×4, 4×8, or other size frequency transforms (e.g., DCT) to prediction residuals for predicted frames.

A quantizer (870) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (800) can use frame dropping, adaptive filtering, or other techniques for rate control.

When a reconstructed current frame is needed for subsequent motion estimation/compensation, an inverse quantizer (876) performs inverse quantization on the quantized spectral data coefficients. An inverse frequency transformer (866) then performs the inverse of the operations of the frequency transformer (860), producing a reconstructed prediction residual (for a predicted frame) or a reconstructed key frame. If the current frame (805) was a key frame, the reconstructed key frame is taken as the reconstructed current frame (not shown). If the current frame (805) was a predicted frame, the reconstructed prediction residual is added to the motion-compensated current frame (835) to form the reconstructed current frame. The frame store (820) buffers the reconstructed current frame for use in predicting the next frame. In some embodiments, the encoder applies a deblocking filter to the reconstructed frame to adaptively smooth discontinuities in the blocks of the frame.

The entropy coder (880) compresses the output of the quantizer (870) as well as certain side information (e.g., motion information (815), spatial extrapolation modes, quantization step size). Typical entropy coding techniques include arithmetic coding, differential coding, Huffman coding, run length coding, LZ coding, dictionary coding, and combinations of the above. The entropy coder (880) typically uses different coding techniques for different kinds of information (e.g., DC coefficients, AC coefficients, different kinds of side information), and can choose from among multiple code tables within a particular coding technique.

The entropy coder (880) puts compressed video information (895) in the buffer (890). A buffer level indicator is fed back to bitrate adaptive modules.

The compressed video information (895) is depleted from the buffer (890) at a constant or relatively constant bitrate and stored for subsequent streaming at that bitrate. Therefore, the level of the buffer (890) is primarily a function of the entropy of the filtered, quantized video information, which affects the efficiency of the entropy coding. Alternatively, the encoder system (800) streams compressed video information immediately following compression, and the level of the buffer (890) also depends on the rate at which information is depleted from the buffer (890) for transmission.

Before or after the buffer (890), the compressed video information (895) can be channel coded for transmission over the network. The channel coding can apply error detection and correction data to the compressed video information (895).

B. Video Decoder

FIG. 9 is a block diagram of a general video decoder system (900). The decoder system (900) receives information (995) for a compressed sequence of video frames and produces output including a reconstructed frame (905). Particular embodiments of video decoders typically use a variation or supplemented version of the generalized decoder (900).

The decoder system (900) decompresses predicted frames and key frames. For the sake of presentation, FIG. 9 shows a path for key frames through the decoder system (900) and a path for forward-predicted frames. Many of the components of the decoder system (900) are used for compressing both key frames and predicted frames. The exact operations performed by those components can vary depending on the type of information being compressed.

A buffer (990) receives the information (995) for the compressed video sequence and makes the received information available to the entropy decoder (980). The buffer (990) typically receives the information at a rate that is fairly constant over time, and includes a jitter buffer to smooth short-term variations in bandwidth or transmission. The buffer (990) can include a playback buffer and other buffers as well. Alternatively, the buffer (990) receives information at a varying rate. Before or after the buffer (990), the compressed video information can be channel decoded and processed for error detection and correction.

The entropy decoder (980) entropy decodes entropy-coded quantized data as well as entropy-coded side information (e.g., motion information (815), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (980) frequently uses different decoding techniques for different kinds of information (e.g., DC coefficients, AC coefficients, different kinds of side information), and can choose from among multiple code tables within a particular decoding technique.

If the frame (905) to be reconstructed is a forward-predicted frame, a motion compensator (930) applies motion information (915) to a reference frame (925) to form a prediction (935) of the frame (905) being reconstructed. For example, the motion compensator (930) uses a macroblock motion vector to find a macroblock in the reference frame (925). A frame buffer (920) stores previous reconstructed frames for use as reference frames. The motion compensator (930) can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder (900) also reconstructs prediction residuals.

When the decoder needs a reconstructed frame for subsequent motion compensation, the frame store (920) buffers the reconstructed frame for use in predicting the next frame. In some embodiments, the encoder applies a deblocking filter to the reconstructed frame to adaptively smooth discontinuities in the blocks of the frame.

An inverse quantizer (970) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (960) converts the quantized, frequency domain data into spatial domain video information. For block-based video frames, the inverse frequency transformer (960) applies an inverse DCT ["IDCT"] or variant of IDCT to blocks of the DCT coefficients, producing pixel data or prediction residual data for key frames or predicted frames, respectively. Alternatively, the frequency transformer (960) applies another conventional inverse frequency transform such as a Fourier transform or uses wavelet or subband synthesis. In embodiments in which the decoder uses spatial extrapolation (not shown in FIG. 9) to decode blocks of key frames, the inverse frequency transformer (960) can apply a re-oriented inverse frequency transform such as a skewed IDCT to blocks of prediction residuals for the key frame. In other embodiments, the inverse frequency transformer (960) applies an 8×8, 8×4, 4×8, or other size inverse frequency transforms (e.g., IDCT) to prediction residuals for predicted frames.

III. Intraframe Encoding and Decoding

In one or more embodiments, a video encoder exploits redundancies in typical still images in order to code the information using a smaller number of bits. The video encoder uses spatial extrapolation of a current block of the image being encoded from its previously decoded neighborhood in the image. The encoder encodes information describing the direction and type of the spatial extrapolation, and then encodes the difference between the block as predicted with spatial extrapolation and the original block. Various features of the spatial extrapolation can be used in combination or independently. These features include, but are not limited to:

1a) Using spatial extrapolation in an encoder or decoder to reduce block entropy in intraframe compression.

1b) Using one of multiple extrapolation modes in an encoder or decoder. The modes can include linear directional, blended, and/or bi-directional modes.

2a) Prediction of extrapolation mode for a current block from contextual information in neighboring blocks. Differential orientations are rank ordered conditioned on a predicted extrapolation mode.

2b) Using the rank orderings to compute spatial extrapolations, which improves the performance of the encoder.

2c) Selectively transmitting differential orientations, which reduces overall bitrate.

3a) Using a skewed frequency transform in an encoder or decoder for coding/decoding a prediction residual for a spatially extrapolated block. The skewed frequency transform exploits the non-stationary nature of the prediction residual.

3b) Adaptively disabling the skewed frequency transform, thereby preventing banding artifacts.

4) Using one of multiple scan patterns depending on extrapolation mode in an encoder or decoder.

5a) Using contextual information in neighboring blocks to select entropy code tables in an encoder or decoder.

5b) Using contextual information in neighboring blocks to switch entropy code tables in an encoder or decoder.

6a) Using a deblocking filter in a spatial extrapolation loop in an encoder or decoder to smooth block discontinuities, which improves spatial extrapolation.

6b) Using an adaptive deblocking filter in such a spatial extrapolation loop.

Spatial extrapolation is performed on a block basis across the luminance channel for macroblocks in 4:2:0 or another macroblock format. In the chrominance channels, coding takes place block by block, with the spatial extrapolation information being pulled from the corresponding luminance blocks. The extrapolation mode (sometimes called the orientation mode or prediction mode) determines the specific operation used to extrapolate the block. In general, side information regarding the mode of a block is transmitted as part of the bitstream (exceptions are dealt with later).

Figure 10:
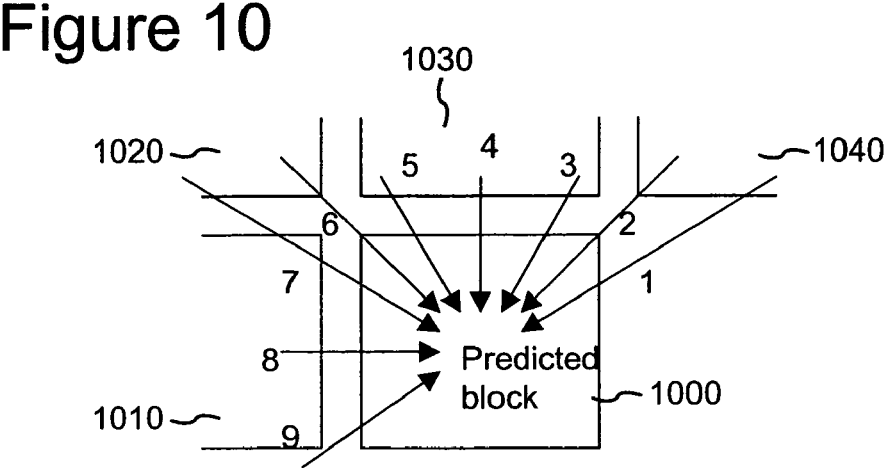
FIG. 10 is a diagram of extrapolation mode directions and indices used in spatial extrapolation for a block of pixels.

With reference to FIG. 10, in general, the encoding process takes place as follows: the current 8×8 block (1000) is extrapolated entirely from its causal neighbors given a certain extrapolation mode. By definition, the causal neighborhood is generated by decoding the previously coded blocks (1010, 1020, 1030, 1040) of the image. The difference between the current block (1000) and its extrapolation is computed. The 8×8 difference matrix is further coded using a linear transform (a modified version of the DCT in some embodiments). Transform coefficients are quantized, zigzag scanned and run length encoded. Decoding is the inverse process of encoding. The prediction mode and causal neighborhood are known at the decoder. Using this information, the extrapolation of the current block is generated. The dequantized difference matrix is regenerated from the bitstream, and is added to the extrapolation to generate the decoded block.

A. Extrapolation Modes

Extrapolation modes are sets of rules that determine the extrapolation of the current block from its causal neighborhood. Each mode is associated with a distinct extrapolator, and one out of these modes is picked for encoding the current block. In one implementation, the video encoder and decoder uses thirteen extrapolation modes. These include horizontal, vertical and seven diagonal extrapolations of the predicting edges (i.e. edge pixels of the causal neighbor blocks abutting the current block), smooth blends of horizontal and vertical predictions, and a bi-directional diffusion type operation called the null prediction. In addition, there is a mode used when the causal blocks have negligible variation (flat condition). FIG. 10 shows the general directions and indices for the horizontal, vertical, and diagonal extrapolation modes. In alternative embodiments, the encoder and decoder use more or fewer than thirteen modes, each configured the same or differently than a mode described below.

Figure 11:
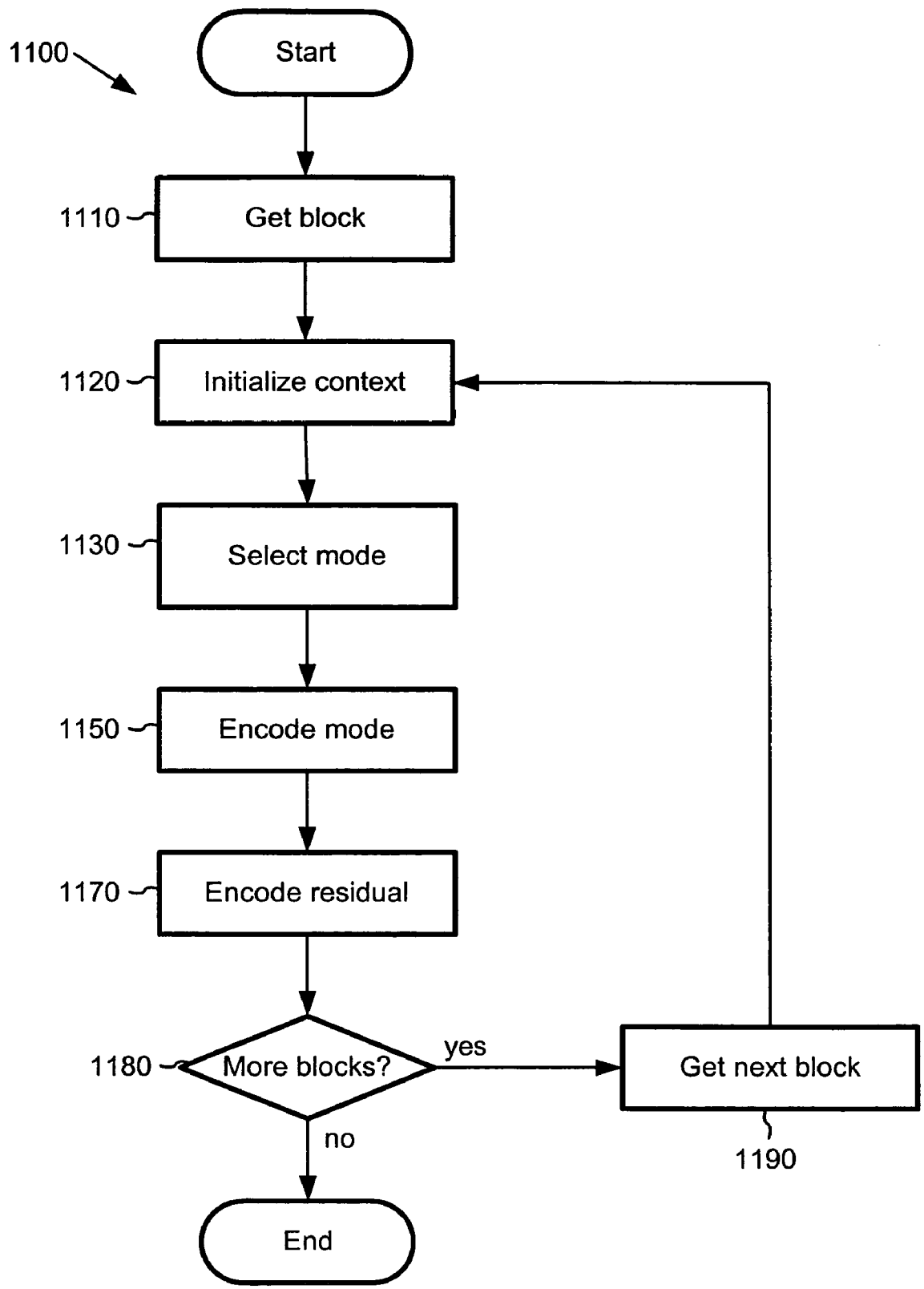
FIG. 11 is a flowchart showing a technique for spatial extrapolation of blocks of pixels.

FIG. 11 shows a general technique (1100) for spatial extrapolation of blocks of pixels. For the sake of simplicity, FIG. 11 does not show the various ways in which the technique (1100) can be used in conjunction with other techniques.

Figure 12:
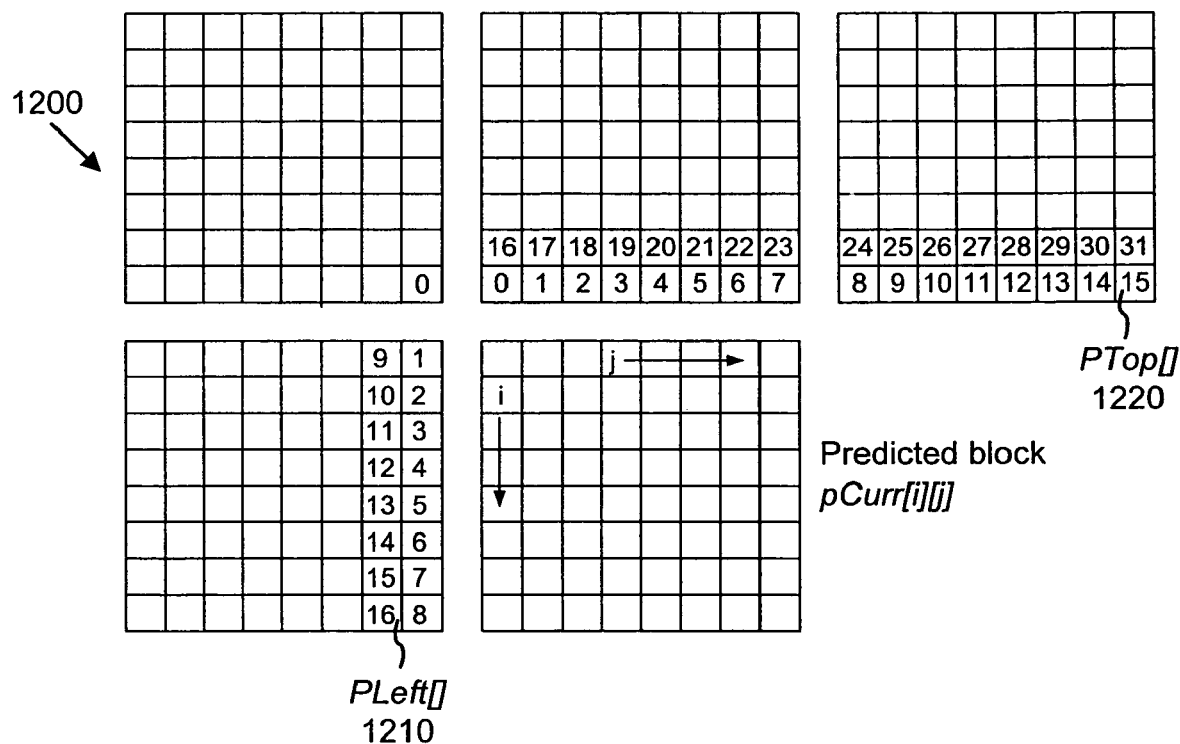
FIG. 12 is a diagram of neighboring values used in spatial extrapolation for a block of pixels.

A video encoder gets (1110) a block of pixels such as an 8×8 block of pixels in a key frame. The encoder initializes (1120) the context for the block by initializing data structures and settings used to select the extrapolation mode for the block. For example, the encoder initializes arrays as shown in FIG. 12. Alternatively, the encoder uses other data structures.

Figure 13:
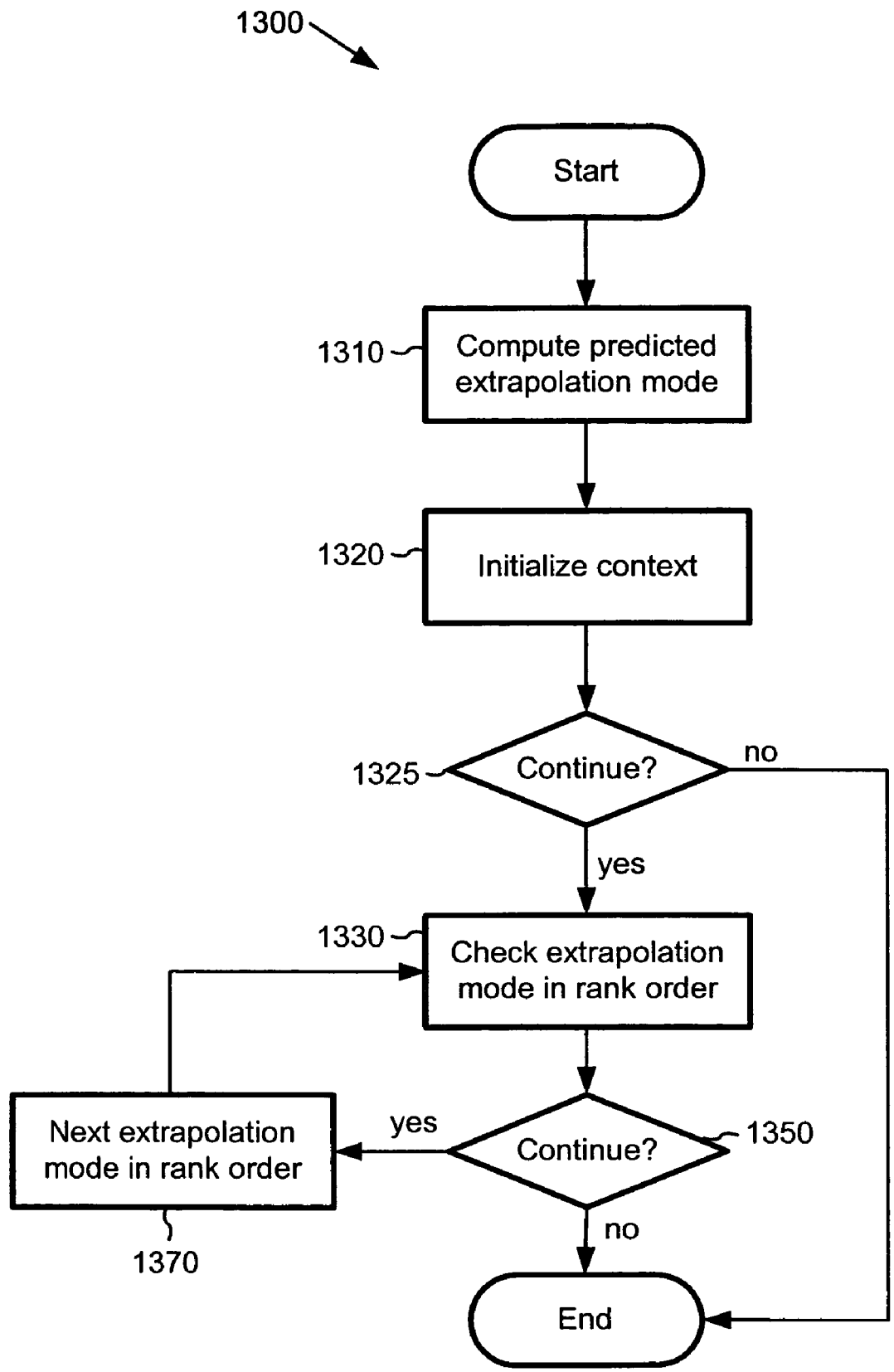
FIG. 13 is a flowchart showing a technique for selecting a spatial extrapolation mode for a block of pixels using prediction.

The video encoder selects (1130) an extrapolation mode for the block. For example, the video encoder selects a mode from among the thirteen modes described below. The video encoder can select an extrapolation mode using prediction of the extrapolation mode as shown in FIG. 13, a closed-loop (actual coding) or open-loop (estimation) search across all or a subset of extrapolation modes, or another selection technique.

The encoder encodes (1150) the extrapolation mode for transmission as side information. For example, the encoder encodes an index representing a differential ordering in a rank order for extrapolation modes selected using prediction. Alternatively, the encoder encodes the extrapolation mode using a Huffman code or other entropy code, or sends the extrapolation mode as a literal value. In some embodiments, the encoder need not encode or send the extrapolation mode for a block if the extrapolation mode can be derived using contextual information available to the encoder and the decoder. Orientation information is not transmitted for the chrominance channels in any case. Chrominance blocks use a meta-direction of the top-left block in the corresponding luminance macroblock. Alternatively, an encoder selects a spatial extrapolation mode and encodes mode information for chrominance blocks as well as luminance blocks.

The encoder encodes (1170) the residual error between the original block and the spatially extrapolated block. For example, the encoder uses a skewed DCT, which can be selected from among one or more available skewed DCTs. Alternatively, the encoder uses another frequency transform or sends the residual in an uncompressed form. In some embodiments, the encoder does not encode or send the residual, for example, due to bitrate constraints, because the spatial extrapolation alone is adequate, or because the encoder did not compute a residual. The encoder can also use entropy encoding to encode the residual, as described below.

The encoder reconstructs the block so that the block can be used for spatial extrapolation of other blocks in the frame. In some embodiments, the encoder applies a deblocking filter to the reconstructed block to smooth block discontinuities with other, previously reconstructed blocks.

The encoder determines (1180) whether there are more blocks in the key frame. If not, the technique (1100) ends. If so, the encoder gets (1190) the next block in the key frame and initializes the context (1120) for it.

1. Initializing Context for a Block

FIG. 12 shows contextual information (1200) and data structures used for spatial extrapolation of a predicted block of pixels in one implementation. The contextual information (1200) comes from blocks to the immediate left, top-left, top, and top-right of the predicted block. Selected pixels from the neighboring blocks are organized into one-dimensional arrays. The selected pixels are numbered and labeled for the sake of presentation. The contextual information (1200) and data structures are functionally related to the extrapolation modes described in detail below. Alternative implementations use a different configuration of contextual information and data structures.

In one implementation, the encoder predicts the orientation for the current block from that of it causal neighbors. The predicted extrapolation mode can be null, horizontal or vertical. If the current block is at the top left corner of the image, the predicted extrapolation mode is null. Otherwise, if the current block is in the topmost row, the predicted extrapolation mode is horizontal (8), or if the current block is in leftmost column, the predicted extrapolation mode is vertical (4). In other cases, the predicted extrapolation mode is a function of the top-left (TL), left (L) and top (T) block meta-directions.

The encoder maps a meta-direction from an actual orientation direction, for example, as shown to Table 2. Alternatively, the encoder uses a linear function or other non-linear function to map an actual orientation direction to a meta-direction.

TABLE 2

Mapping Actual Orientation Directions to Meta-directions

| Actual Orientation | Meta-direction |
|---|---|
| Horizontal (8) | H (8) |
| Vertical (4) | V (4) |
| All others | Null (0) |

Based on the meta-directions of the top-left (TL), left (L) and top (T) blocks, and a quantization parameter ["QP"], the encoder computes the predicted extrapolation mode, for example, as shown in Table 3. Alternatively, the encoder uses a linear or other non-linear function to compute a predicted extrapolation mode for a block from the meta-directions from the neighboring blocks, or uses more or fewer predicted modes than Table 3. Working with the same contextual information during decoding, the decoder can also compute a predicted extrapolation mode for the predicted block.

TABLE 3

Determining Predicted Extrapolation Mode from Meta-Directions

| L | T | Predicted Extrapolation Mode | Notes |
|---|---|---|---|
| X | X | X | If the meta-directions of blocks L and T are the same, use the meta-direction as the predicted mode. |
| H | 0 | H | Horizontal continuity from left. |
| 0 | V | V | Vertical continuity from top. |
| H | V | H | Horizontal continuity over-rides vertical. |
| V | H | Code segment:<br>if (TL==L) PEM=T;<br>else {<br>  if (QP>12) PEM=T;<br>  else {<br>    if (TL==T) PEM=L;<br>    else    PEM=TL;<br>  }<br>} | |

With reference to FIG. 12, a first one-dimensional array (1210) labeled pLeft[ ] includes 17 pixel values from the left and top-left. A second one-dimensional array (1220) labeled pTop[ ] includes 32 pixel values from the top and top-right blocks. A two-dimensional array labeled pCurr[ ] stores pixels values for the predicted block.

Before spatial extrapolation of a block, the encoder performs a set of operations on the causal predicting edges. A decoder performs the same operations on the same causal predicting edges, such that the encoder and decoder can use the same information for spatial extrapolation and context. The encoder and decoder use the pixel information when evaluating extrapolation modes, and can also use contextual information to select extrapolations modes by default under certain circumstances.

First, the encoder/decoder fills the arrays pLeft[ ] and pTop[ ]. If the predicted block is at the top left boundary of a key frame, all neighbors pLeft[ ] and pTop[ ]are set to 128. If the predicted block is on the top row (but not at the left extreme), pLeft[0] and pTop[ ]are set to pLeft[1]. If the predicted block is in the first column (but not at the top extreme), all elements of pLeft[ ]are set to pTop[0]. The neighboring elements are copied from the causal reconstructed neighbor blocks of the current color plane.

Next, the encoder/decoder computes contextual information. Specifically, the encoder/decoder computes the range of the immediate neighbors (i.e., the maximum value minus the minimum value of pLeft[0 . . . 8] and pTop[0 . . . 7]). In general, a large range indicates extrapolation could be useful for the predicted block; a small range indicates the predicted block is likely similar to the neighboring blocks, and the predicted extrapolation mode will likely suffice. For example, if the range is either less than QP or less than 3, the predicted extrapolation mode of the predicted block is reset to the null predictor. If range is less than 3, flat mode is activated, which is described below.

For luminance channels, if the range is smaller than 2QP, and the predicted block is not on the top or left periphery of the image, horizontal and vertical predicted extrapolation modes are changed to blended horizontal and blended vertical modes, which are described below. Also, if the range is smaller than 2QP, the orientation mode is not transmitted (or received). This ensures that bits are not wasted transmitting spatial orientation information if there is little information in the causal boundary to begin with.

Alternatively, the encoder/decoder compute other contextual information and/or check other contextual conditions.

2. Selecting an Extrapolation Mode

FIG. 13 shows a technique for selecting an extrapolation mode using prediction. Prediction of extrapolation mode can speed up the selection process in the encoder and reduce the average bitrate associated with sending extrapolation mode information to the decoder. For the sake of simplicity, FIG. 13 does not show the various ways in which the technique (1300) can be used in conjunction with other techniques.

The encoder computes (1310) a predicted extrapolation mode, as described above. The encoder then initializes (1320) the context for the block and determines (1325) whether the encoder needs to check other extrapolation modes, as described above. If the context indicates what the extrapolation mode should be for the block, the technique (1300) ends. For example, the range of the immediate neighboring pixels of the block might indicate that the mode should be blended horizontal, blended vertical, or flat.

Otherwise, the encoder then checks (1330) an extrapolation mode in a rank order associated with predicted extrapolation mode. For example, exemplary rank orders for null, horizontal, and vertical predicted extrapolation modes are shown in

TABLE 4

Exemplary Rank Orders

| Predicted Mode | Rank Orders |
|---|---|
| Null | int orderArray[ ] = {0, 8, 4, 10, 11, 2, 6, 9, 1, 3, 5, 7}; |
| Horizontal | int orderArrayH[ ] = {8, 0, 4, 10, 11, 1, 7, 2, 6, 9, 3, 5}; |
| Vertical | int orderArrayV[ ] = {4, 0, 8, 11, 10, 3, 5, 2, 6, 9, 1, 7}; |

Alternatively, the encoder uses different rank orders.

The rank orders indicate by mode index the order in which the encoder should try extrapolation modes. The first element of each array is the associated predicted extrapolation mode, and the remaining modes are ordered roughly according to likelihood of suitability for the block. Later, shorter variable length codes can be assigned to indices early in a rank order, and longer variable length codes to indices later in the rank order.

The encoder checks (1330) an extrapolation mode by applying the extrapolation to the block and comparing the spatial extrapolation to the original block. The encoder can measure the magnitude of the difference in the spatial domain or in the frequency domain (e.g., DCT of the difference block) with an error measure. The error measure is a sum of absolute differences ["SAD"], mean square error ["MSE"], a perceptual distortion measure, or other error measure. The encoder can also consider the relative bit costs of variable length codes associated with extrapolation mode information when evaluating the fitness of an extrapolation mode, which favors modes with shorter corresponding variable length codes (which typically appear earlier in the rank order).

In one implementation, if the encoder determines that the orientation of a certain 8×8 block is significant, the encoder estimates the orientation. The estimation process starts by rank-ordering 12 possible orientation directions in one of three orderings corresponding to the prediction meta-direction (as shown in the rank orders above).

The encoder then computes a cost function for each orientation. The cost function considers the difference between the actual pixel values of the block being encoded and the spatial extrapolation resulting from applying the particular orientation. The cost function is a composite of: (1) the quantization error of the DCT coefficients associated with the error signal, (2) a simplification of the run-length information, and (3) a base cost corresponding to the rank order of the particular orientation.

The base cost is defined as $$\begin{aligned} C\_base &= 0, & \text{for rank} = 0, 1, 2 \\ &= 32 * QP & \text{for ranks } 3, 4 \\ &= 64 * QP & \text{for ranks } 5 \ldots 11 \text{ in the rank order,} \end{aligned}$$

where QP is the quantization parameter. The quantization error is defined as:

$$\text{abs(reconstructed\_value-unquantized\_value)} \quad (1),$$

which is summed over all coefficients (i.e., SAD). Coefficients that are quantized to zero have the quantization error:

$$\text{abs(unquantized\_value)} \quad (2).$$

The simplified run-length cost is only accrued for coefficients quantized to non-zero values. This cost is given by:

$$(\text{index}+32)*QP \quad (3),$$

where index is the scan order index in the appropriate zigzag scan order for the current orientation. Scan orders are described below.

In other implementations, the encoder uses different cost functions and/or considers more or less information. Alternatively, the encoder evaluates the fitness of an extrapolation mode using an open-loop or heuristic approach.

The encoder determines (1350) whether it should continue checking additional extrapolation modes. The encoder stops if it has checked the last extrapolation mode in a rank order. The encoder can do a full search of all extrapolation modes. Alternatively, the encoder terminates the search if certain conditions are satisfied. For example, the encoder terminates the search if the fitness measure for the mode the encoder just checked exceeds the fitness measure of the best mode checked so far, with the assumption that matches get worse further down in the rank order. Or, the encoder can terminate on other conditions.

If the encoder determines (1350) it should not continue, the technique (1300) ends and the encoder goes on with the encoding of the extrapolation mode and residual error, reconstruction, etc. Otherwise, the encoder gets (1370) and checks (1330) the next extrapolation mode in the rank order.

3. Horizontal and Vertical Modes

Figure 14:
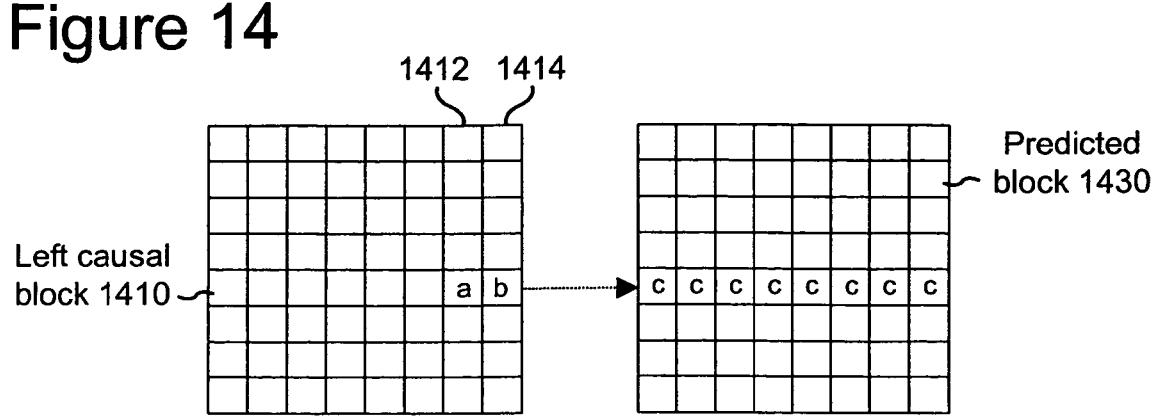
FIG. 14 is a diagram of showing a horizontal extrapolation mode used in spatial extrapolation for a block of pixels.

FIG. 14 illustrates horizontal extrapolation mode (mode index 8). On a row-by-row basis, the pixel values a and b in the two rightmost columns (1412, 1414) in the reconstructed block (1410) to the left of the predicted block (1430) are averaged. The averaged value c is copied across all columns of the corresponding row of the predicted block.

$$c = \left\lfloor \frac{a+b+1}{2} \right\rfloor, \quad (4)$$

where $\lfloor \ \rfloor$ is a downward rounding operation.

The vertical extrapolation mode (mode index 4) is the transpose of horizontal extrapolation mode. In other words, on a column-by-column basis, the pixel values a and b in the bottom two rows of the reconstructed block to the top of the predicted block are averaged. The averaged value c is copied across all rows of the corresponding column of the predicted block.

Alternatively, the encoder and decoder use other formulas for horizontal and vertical extrapolation.

4. Diagonal Modes

FIG. 15*a* shows pseudocode (1510) defining predictors for additional modes for spatial extrapolation, including seven diagonal extrapolation modes. The diagonal extrapolation modes (with mode indices 1-3, 5-7 and 9) roughly correspond to extrapolations in increments of approximately 22.5 degrees proceeding counter-clockwise.

Alternatively, the encoder and decoder use other formulas for diagonal extrapolation.

5. Blended Modes

FIG. 15*b* shows pseudocode (1520) for two additional extrapolation modes (indices 10 and 11), a blended horizontal mode and a blended vertical mode. The blended horizontal mode and blended vertical mode blend features from both the top and left blocks while predicting the current block. The blend is a linear combination of corresponding horizontal and vertical prediction edge pixels.

The blended modes are the default modes under certain circumstances, depending on context. For example, for some blocks, if the range of immediate neighboring values is less than 2QP, a blended horizontal or vertical extrapolation mode is used for a horizontal or vertical predicted mode, respectively, and extrapolation mode information is not transmitted.

Alternatively, the encoder and decoder use other formulas for blended extrapolation.

6. Null Mode

The null mode is the most common mode for low bitrate applications. FIG. 15*c* shows pseudocode (1530) used in a fast implementation of a null extrapolation mode (mode index 0, also called a bi-directional extrapolation mode). The null extrapolation mode extrapolates the current block from its causal neighbors independent of direction. The idea is to predict pixel pCurr[i][j] as a linear combination of pTop and pLeft elements (e.g., 12 pTop elements and 8 pLeft elements), with weights being proportional to a negative exponent of the distance. In practice, however, this form is slow to compute.

Therefore, in one implementation, the null extrapolation mode is based on an approximate separable reformulation of the above that is faster to compute. In this simplification, the encoder computes two arrays of cumulants corresponding to the pixel locations of the predicting edges. The current predicted pixel is then a linear sum of one element from each cumulant array.

The first stage of building the cumulant arrays is to set up an array of weights roughly corresponding to lowpass filtered left and top predicting edge pixels. These cumulant arrays are labeled pLeftSum and pTopSum respectively. FIG. 15c shows pseudocode (1530) used to build cumulant arrays in this fast implementation.

Once the arrays pLeftSum and pTopSum are set up, the predicted block is computed by summing the appropriate element from each array, using the rule.

$$pCurr[i][j]=(pTopSum[j]*pWtsT[i][j]+pLeftSum[i]*pWtsL[i][j]+32768)>>16,$$

where the weight arrays pWtsT[i][j] and pWtsL[i][j] are shown in FIG. 15d.

Alternatively, the encoder and decoder use other formulas for bi-directional extrapolation or different weights.

7. Flat Mode

The flat extrapolation mode (no index number) is used under circumstances in which the encoder finds little significant information in the causal boundary of the current block. Therefore, the encoder assigns to each pixel of the current block an average value from the causal boundary. For example, the encoder computes a DC value iDcValue:

$$iDcValue = \left\lfloor \frac{\sum_{0\leq i \leq 9} pTop[i] + \sum_{0\leq i \leq 8} pLeft[i] + 9}{19} \right\rfloor. \quad (5)$$

The flat mode is the default mode under certain circumstances, depending on context. For example, for some blocks, if the range of immediate neighboring values is less than 3, flat mode is used and extrapolation mode information is not transmitted. The residual block for a block predicted in flat mode is computed and encoded. Special treatment of predicted blocks and residual blocks under flat mode is further described below.

Alternatively, the encoder and decoder use other formulas for flat extrapolation.

B. Orientation Transmission

The encoder transmits the orientation of the predicted block (i.e., the extrapolation mode or differential rank ordering) when the decoder needs such information to determine the actual extrapolation mode of the predicted block. Under certain circumstances (e.g., the circumstances discussed above with respect to initialization of context), the encoder does not transmit (nor does the decoder expect) orientation information.

In one implementation, the encoder transmits orientation information only for luminance blocks, not chrominance blocks, of macroblocks. The chrominance blocks are spatially extrapolated using information provided or derived for the luminance blocks (e.g., information for the top-left luminance blocks, median information, mean information).

When the encoder selects extrapolation mode using prediction, the encoder can send (and the decoder can receive) extrapolation mode information as a difference between the actual extrapolation mode and a predicted extrapolation mode, for example, a rank order differential. A rank order differential is an index in a rank order. The rank order can be associated with a predicted extrapolation mode, in which case the encoder/decoder selects a rank order conditioned on the direction of the predicted extrapolation mode. For example, exemplary orderings for null, horizontal, and vertical predicted extrapolation modes are shown above in Table 4. Alternatively, the encoder uses different rank orders and/or rank orders for more or fewer predicted extrapolation modes.

If a decoder receives a differential index 7 for a block whose predicted extrapolation mode is horizontal, orderArrayH[7] gives the actual orientation to be mode 2 (diagonal from the top-right). Orderings are designed for coding efficiency—shorter variable length codes are assigned to earlier indices for more likely modes, and longer variable length codes are assigned to later indices for less likely modes. Table 5 shows Huffman code tables for differential orientation values in one implementation. Specifically, Table 5 shows two Huffman code tables for typical low bitrate conditions (e.g., indicated by QP>12). A flag signaled in the bitstream indicates which set of codes (e.g., set 0 or set 1) to use. In this implementation, different sets of Huffman code tables are used for typical high bitrate conditions (e.g., indicated by QP<=12). Other implementations use different entropy codes and/or different code tables for different predicted orientations.

TABLE 5

Huffman Codes for Differential Orientation Values, Low Bitrate

| DIFF-ORIENT | Code Set 0 | | Code Set 1 | |
|---|---|---|---|---|
| | Code | Length | Code | Length |
| 0 | 0 | 2 | 0 | 1 |
| 1 | 1 | 2 | 2 | 2 |
| 2 | 4 | 3 | 6 | 3 |
| 3 | 5 | 3 | 1c | 5 |
| 4 | 6 | 3 | 1d | 5 |
| 5 | 38 | 6 | 78 | 7 |
| 6 | 1d | 5 | 3d | 6 |
| 7 | 39 | 6 | 79 | 7 |
| 8 | 3c | 6 | 7c | 7 |
| 9 | 3d | 6 | 7d | 7 |
| 10 | 3e | 6 | 7e | 7 |
| 11 | 3f | 6 | 7f | 7 |

Figure 16:
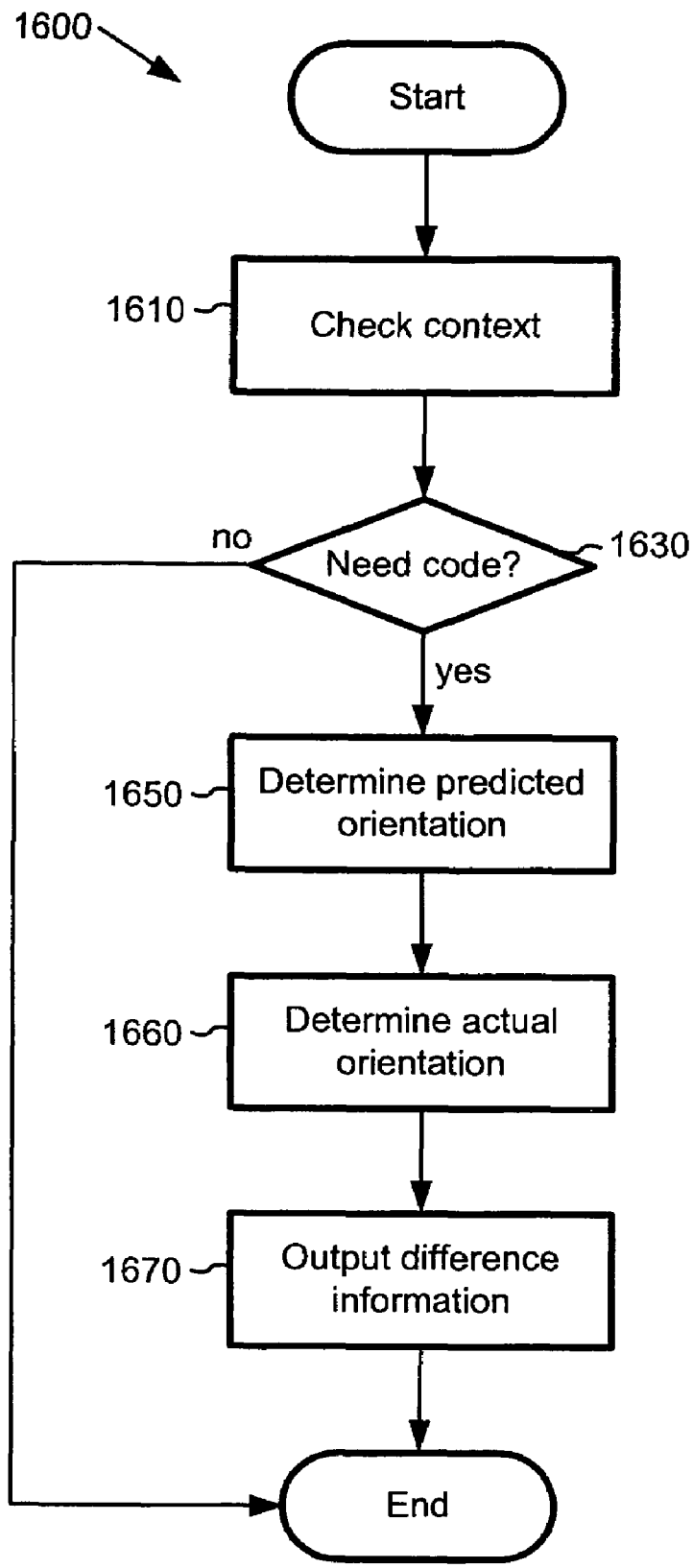
FIG. 16 is a flowchart showing a technique for encoding extrapolation mode information in a video encoder.
Figure 17:
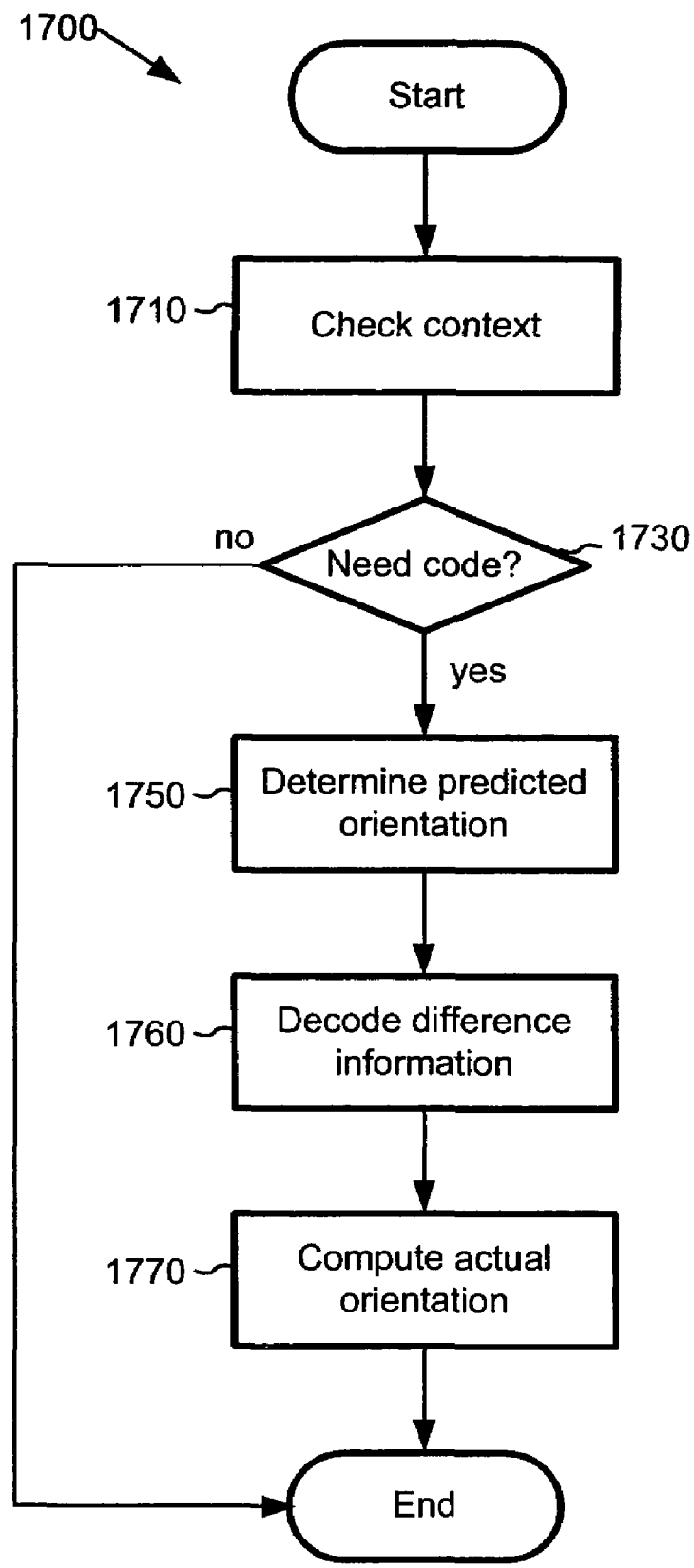
FIG. 17 is a flowchart showing a technique for decoding extrapolation mode information in a video decoder.

FIG. 16 shows a technique for encoding extrapolation mode information, and FIG. 17 shows a technique for decoding extrapolation mode information. By transmitting extrapolation mode information only when such information cannot be ascertained from context, overall bitrate is reduced and the decoder is sped up. For the sake of simplicity, FIGS. 16 and 17 do not show the various ways in which the techniques (1600, 1700) can be used in conjunction with other techniques.

With reference to FIG. 16, an encoder checks (1610) the coding context for encoding a predicted block. For example, the encoder checks the range of immediate neighboring pixels to the predicted block.

The encoder determines (1630) whether it needs to send a code or other extrapolation mode information to the decoder. For example, if the range is less than 3 or less than 2 QP, a default mode (e.g., flat, null, horizontal blended, or vertical blended) is used, and the encoder does not need to send rank order index information to the decoder. If the encoder does not need to send a code or other information, the technique ends.

Otherwise, the encoder determines (1650) the predicted orientation of the predicted block. For example, the encoder uses the predicted extrapolation mode computed during initialization. The encoder then determines (1660) the actual orientation of the predicted block. For example, the encoder uses the actual extrapolation mode as computed above by evaluating potential orientations in a rank ordering.

The encoder outputs (1670) difference information indicating the difference between the actual orientation and the predicted orientation of the predicted block. For example, the encoder outputs a Huffman code for a rank order index that indicates the difference between a predicted extrapolation mode and an actual extrapolation mode in a rank order.

With reference to FIG. 17, a decoder checks (1710) the decoding context for decoding a predicted block. For example, the decoder checks the range of immediate neighboring pixels to the predicted block.

The decoder determines (1730) whether to expect a code or other extrapolation mode information from the encoder. For example, if the range is less than 3 or less than 2 QP, a default mode (e.g., flat, null, horizontal blended, or vertical blended) is used, and the encoder does not need to send rank order index information to the decoder. If the decoder does not receive a code or other information, the technique ends.

Otherwise, the decoder determines (1750) the predicted orientation of the predicted block. For example, the decoder uses a predicted extrapolation mode computed during initialization.

The decoder then decodes (1760) difference information received from the encoder. The difference information indicates a difference between the predicted orientation and an actual orientation of the predicted block. For example, the difference information is a Huffman code for a rank order index that indicates the difference between a predicted extrapolation mode and an actual extrapolation mode in a rank order.

The decoder computes (1770) the actual orientation of the predicted block. For example, the decoder combines a predicted extrapolation mode with a rank order index to determine an actual extrapolation mode in a rank ordering.

C. Re-Oriented Frequency Transform

In the residual block for a spatially extrapolated block of pixels, variance typically increases sharply from points near to point far from the abutting causal block(s). The local spatio-frequency description of the pixels varies correspondingly. The residual error of spatial prediction is typically smaller at pixels close to the block edges abutting causal block(s) from which the prediction is made. For example, for a block predicted in null mode, the abutting causal blocks are both the left and top blocks. For a horizontal (alt. vertical) extrapolator, pixels lying on the left column (alt. top row) show smaller prediction residuals.

These observations suggest the use of a re-oriented frequency transform that shows an upward trend in values at spatial locations away from the prediction edge(s). The re-oriented frequency transform addresses non-stationarity of prediction residuals, resulting in more efficient compression of the prediction residuals.

Figure 18A:
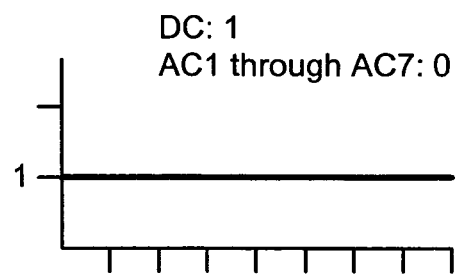
FIGS. 18*a* and 18*b* are graphs illustrating a difference between regular and re-oriented inverse frequency transforms.
Figure 18B:
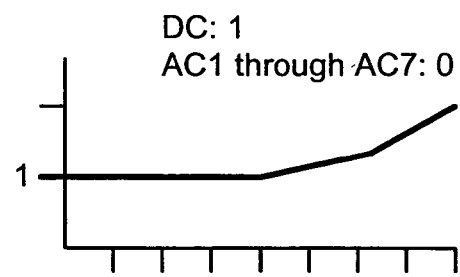

FIGS. 18*a* and 18*b* are graphs illustrating a difference between regular and re-oriented inverse frequency transforms for a row of 8 residual pixels represented with a DC coefficient of 1 and AC coefficients of 0. FIG. 18*a* shows the values if reconstructed using a regular inverse frequency transform. Each value has the average value represented by the DC coefficient. FIG. 18*b* shows the values if reconstructed using a re-oriented inverse frequency transform. The values start at the average value for the early residual pixels, but increase for the later residual pixels. In FIG. 18*b*, the re-oriented frequency transform has an influence only on the DC coefficient, while sparing the AC coefficients of the block from modifications. In alternative embodiments, the re-oriented frequency transform has an influence on one or more of the AC coefficients as well.

One embodiment of a re-oriented frequency transform uses basis functions that show an upward trend in values at spatial locations away from the prediction edge(s). Such basis functions are not easily implemented in practice. Therefore, some embodiments of a re-oriented frequency transform use an approximation of such an ideal frequency transform to exploit non-stationarity across pixels in a residual block in the encoding of the residual block. The approximation uses lifting in the encoder and inverse lifting in the decoder. In contrast to prior art methods that use lifting in the spatial domain, the encoder and decoder use lifting and inverse lifting in the frequency domain.

Figure 19:
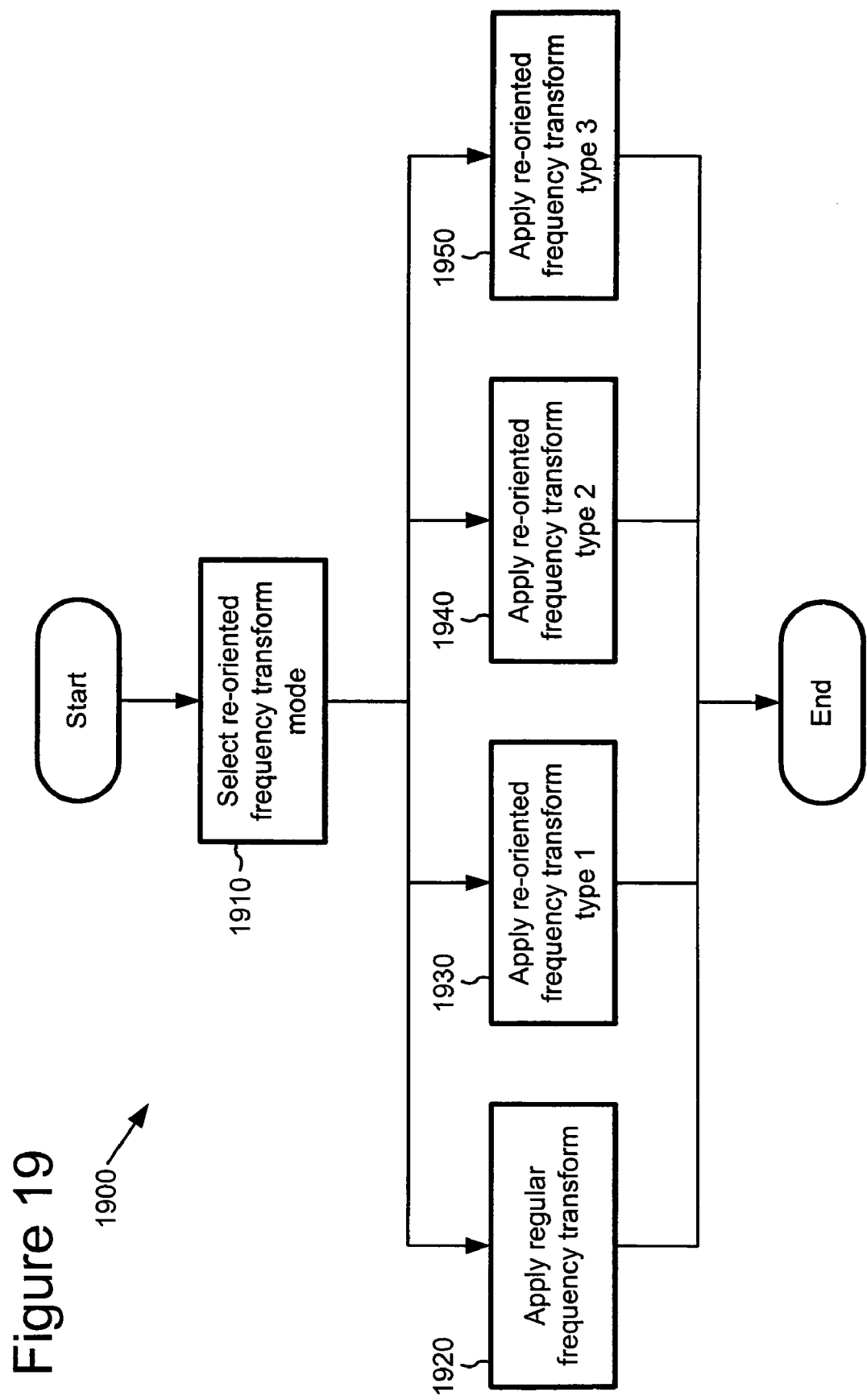
FIG. 19 is a flowchart showing a technique for encoding a block of spatial extrapolation error values using one of multiple available re-oriented frequency transforms.

A video encoder can switch between multiple available re-oriented frequency transform modes, as shown in FIG. 19. The encoder selects (1910) a re-oriented frequency transform mode. For example, depending on the general orientation of the spatial extrapolation used for a predicted block, the encoder selects from among re-oriented transforms that skew the residual block vertically, horizontally, bi-directionally, or not at all. The horizontal re-oriented transform is used for predictors that are largely horizontal (e.g., extrapolation orientation of $\pm\pi/8$ to the horizontal axis). Likewise, the vertical re-oriented transform is used for vertical and near-vertical extrapolators. The bi-directional transform is used for the null and largely diagonal extrapolation directions. All other predictions use a regular transform. The video encoder can switch transform modes for luminance blocks and chrominance blocks with the same decision or different decisions. The encoder then applies the selected type of transform (1920, 1930, 1940, 1950) to the residual block. While FIG. 19 shows four available transform modes (including regular mode), alternative embodiments use more or fewer transform modes, transform modes in different directions, and/or other criteria for selecting transform mode. For the sake of simplicity, FIG. 19 does not show the various ways in which the technique (1900) can be used in conjunction with other techniques.

In one implementation, the re-oriented transforms are re-oriented variations of DCT termed skewed DCT. Using a skewed DCT results in improved coding efficiency. The skew of the DCT is horizontal, vertical, or bi-directional and relates to the extrapolation mode of the predicted block. The horizontal and vertical SDCTs are skewed in one dimension only, whereas the null SDCT is skewed in both dimensions. Also, the horizontal and vertical skews are transposes.

The skewed inverse DCT is defined:

$$SIDCT(T) = T(0,0)B_*(0,0) + \sum_{\substack{i,j=0\ldots 7 \\ i+j>0}} T(i,j)B(i,j), \quad (6)$$

where T( ) is an array of frequency coefficients, B( ) is a set of basis functions, and B.(0,0) is the DC basis function for a frequency transform mode indicated by the subscript *, for example, H, V, or O for horizontal, vertical, or null (bi-directional) transform modes.

The forward SDCT is not orthonormal, and can be defined in terms of the pseudoinverse of the inverse SDCT. This potentially affects all coefficients of the forward transform. An approximation to the pseudoinverse is obtained using lifting and inverse lifting.

Figure 20A:
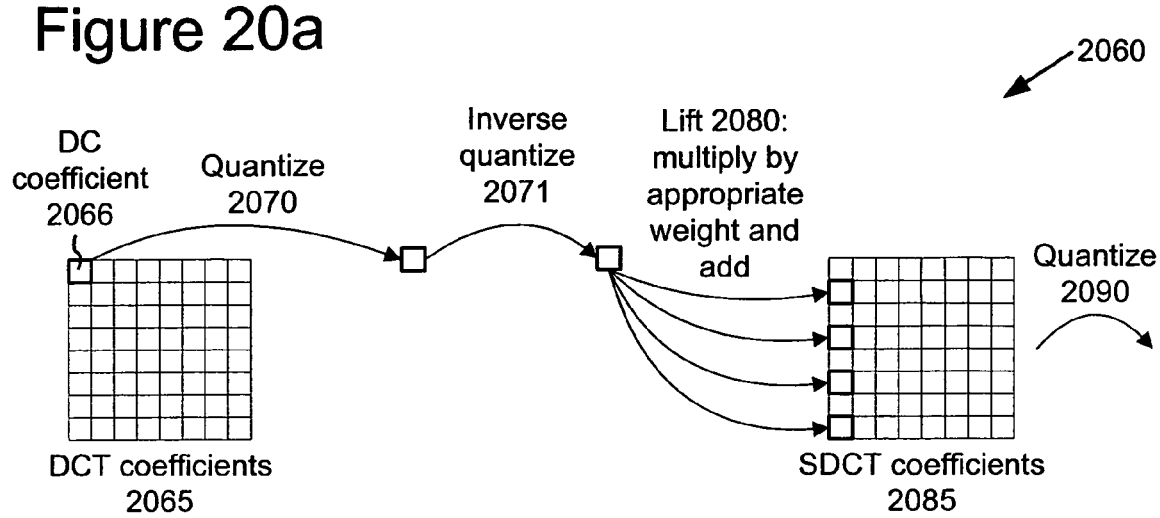
FIG. 20*a* is a diagram showing encoding of a block of spatial extrapolation error values using a skewed DCT.

FIG. 20a illustrates the use of lifting (2060) in an encoder during compression of an 8×8 residual block to implement a skewed DCT in one implementation. The lifting is a reversible operation. After the encoder applies a DCT to the 8×8 residual block, resulting in an 8×8 block of DCT coefficients (2065), the encoder quantizes (2070) the DC DCT coefficient (2066). For example, the encoder applies the quantization described in the next section for DC coefficients. The encoder then inverse quantizes (2071) the DC DCT coefficient (2066). This operation ensures that the encoder and decoder use the same value for the DC DCT coefficient (2066) in lifting and inverse lifting operations.

The encoder then lifts (2080) one or more of the DCT coefficients, where the lifting is a function of the reconstructed DC DCT coefficient value (2066). The DCT transform lifting occurs by subtracting the DC DCT coefficient (2066) from certain coefficients of the DCT coefficients. Namely, the encoder adjusts selected AC coefficients of the left column (as shown in FIG. 20a) or selected AC coefficients of the top row (not shown in FIG. 20a), as described below.

The lifting (2080) produces a block of skewed DCT coefficients (2085), which the encoder then quantizes (2090), for example, using a technique described in the next section. In alternative embodiments, the encoder performs lifting as a function of coefficients other than or in addition to the DC coefficient, adjusts coefficients other than the AC coefficients shown in FIG. 20a, and/or uses a frequency transform other than DCT.

Figure 20B:
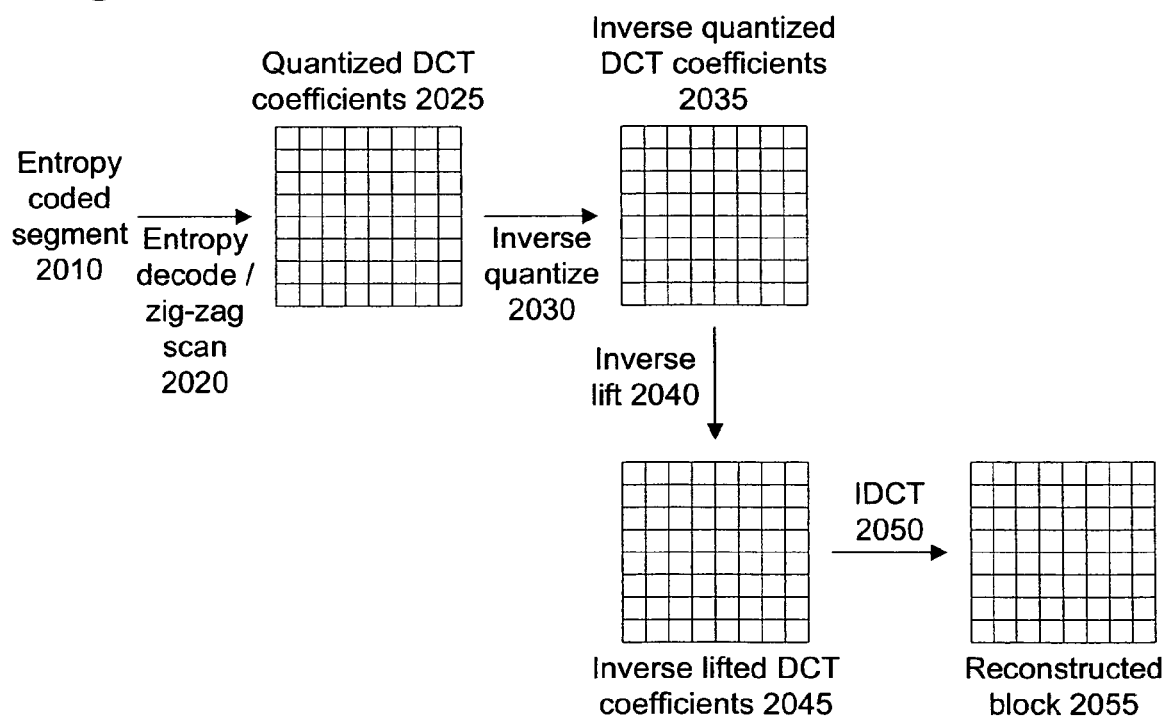
FIG. 20*b* is a diagram showing decoding of a block of spatial extrapolation error values using a skewed inverse DCT.
Figure 21C:

FIG. 20b illustrates the use of inverse lifting in a decoder during reconstruction of an 8×8 residual block to implement a skewed inverse DCT. A decoder receives an entropy coded segment (2010) and entropy decodes and scans (2020) the segment into a two-dimensional block (2025) of quantized DCT coefficients. The decoder inverse quantizes (2030) the DCT coefficients. The decoder then inverse lifts (2040) one or more of the coefficients in the block (2035) of inverse quantized DCT coefficients. The inverse lifting process is described in detail below. Finally, the decoder applies (2050) an inverse DCT to the block (2045) of inverse lifted coefficients. FIGS. 21a-21c show pseudocode (2100) for 8-point IDCT operations for rows and columns in one implementation. For an 8×8 block, an 8-point one dimensional IDCT operation RowIDCT_8Point( ) is performed on each of the 8 rows of the block, then an 8-point one dimensional IDCT operation ColumnIDCT_8Point( ) is performed on each of the 8 resultant columns.

Inverse lifting modifies the inverse quantized transform coefficients to weight the DC response at pixels distant from the predicting edge(s). In one implementation, the decoder can use any one of four lifting modes which correspond to four skewed IDCT modes. The first lifting mode leaves the DCT coefficients untouched. The second and third lifting modes operate on the first row and column of the coefficients, respectively, resulting in horizontal and vertical weighting. The fourth lifting mode operates across the entire block. The second, third and fourth lifting modes are termed horizontal, vertical and bi-directional lifting modes, respectively. The four lifting modes correspond to, in order, regular IDCT, and horizontal, vertical and bi-directional re-oriented IDCTs.

The horizontal and vertical lifting modes are transposes of each other. Let the input inverse quantized transform coefficient matrix for the current block be denoted by pBlock[i][j], where i and j vary from 0 through 7. The horizontal lifting mode modifies four coefficients of the block according to:

$$pBlock[0][1] = pBlock[0][1] - \left\lfloor \frac{6269 \cdot pBlock[0][0] + 32768}{65536} \right\rfloor, \quad (7)$$

$$pBlock[0][3] = pBlock[0][3] - \left\lfloor \frac{708 \cdot pBlock[0][0] + 32768}{65536} \right\rfloor, \quad (8)$$

$$pBlock[0][5] = pBlock[0][5] - \left\lfloor \frac{172 \cdot pBlock[0][0] + 32768}{65536} \right\rfloor, \quad (9)$$

$$pBlock[0][7] = pBlock[0][7] - \left\lfloor \frac{73 \cdot pBlock[0][0] + 32768}{65536} \right\rfloor. \quad (10)$$

The bi-directional lifting mode uses the following rule $$pBlock[i][j] = pBlock[i][j] - sgn(pBwt[i][j]) \cdot \left\lfloor \frac{|pBwt[i][j]| \cdot pBlock[0][0] + 32768}{65536} \right\rfloor \quad (11)$$

where pBwt is the 8×8 array of weights shown in FIG. 22. Alternatively, different lifting formulas and/or weights are used.

The flat condition is a particular situation where the skewed transform presents a liability rather than an advantage. In such situations, the encoder and decoder use the ordinary DCT/IDCT on the residual for a current block. The flat condition is indicated by a coincidence of (i) range less than 3 among luminance pixels in the causal boundary of the current block (which would activate flat extrapolation mode), (ii) quantized DC coefficient being −1, 0 or 1, and (iii) no non-zero AC coefficients. Without any adjustment for the flat condition for such blocks, banding artifacts are observed resulting from "hunting" and quantization of skewed values. Lack of detail in the block makes these artifacts stand out and visually annoying.

Adjustment for the flat condition proceeds by setting all pixels in the block to a common DC value. This DC value is determined as shown in the code below, where iDC is the quantized DC coefficient, and the predicting edge DC value iDcValue is determined during setup. After adjusting for iDC, the DC value is stored back in iDcValue.

iDC+=QuantizeDC(iDcValue<<3);

iDcValue=clamp((DequantizeDC(iDC)+4)>>3);

where clamp( ) returns its integer argument clamped between 0 and 255. Quantization and dequantization of DC coefficients (QuantizeDC and DeuantizeDC) are defined in the next section. The flat condition triggers the flat prediction mode in which all pixels in the predicted block are set to iDcValue. Alternatively, the flat condition is implemented with other formulas.

Figure 23:
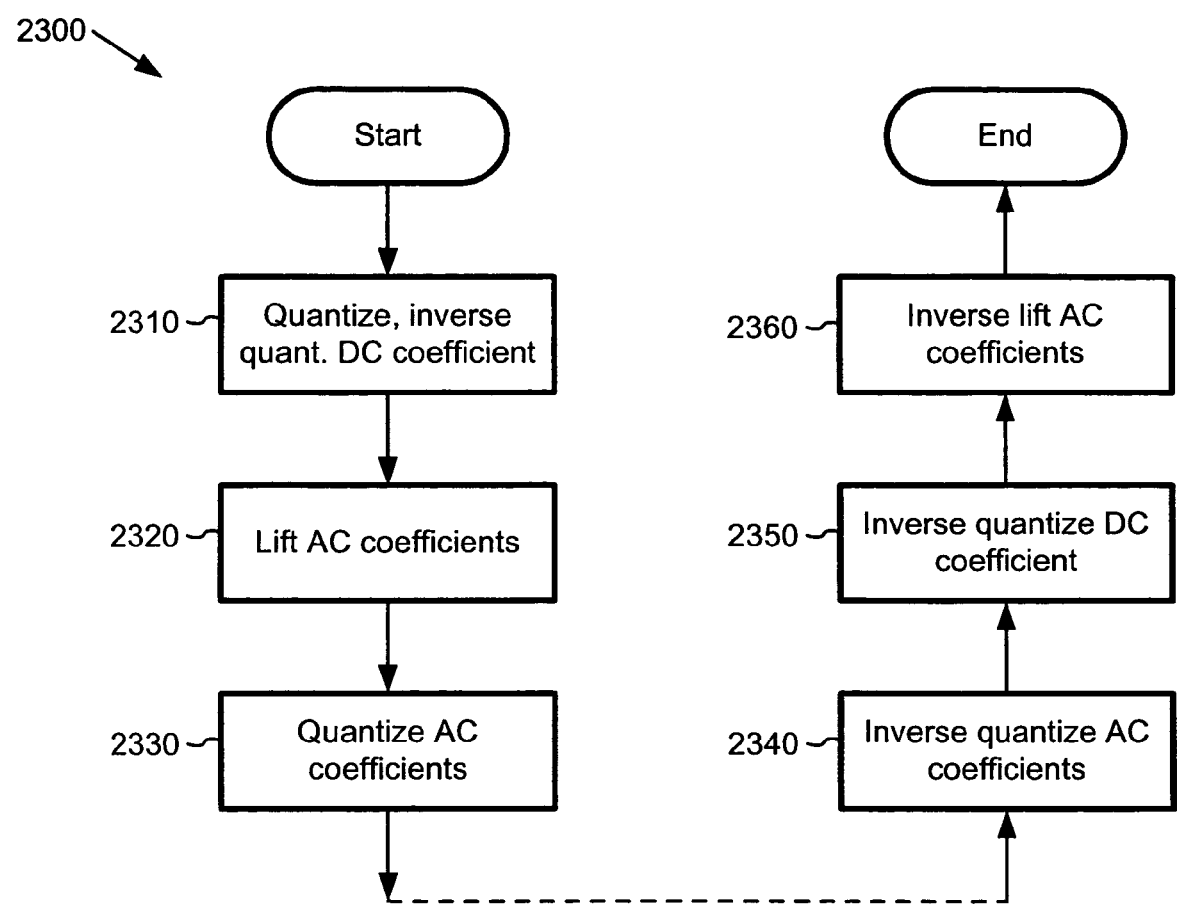
FIG. 23 is a flowchart showing techniques for encoding and decoding a block of spatial extrapolation error values using lifting and inverse lifting, respectively, in transforms.

FIG. 23 shows techniques (2300) for lifting and inverse lifting in embodiments in which the lifting and inverse lifting are functions of the DC coefficient. With reference to FIGS. 20a and 20b, in one implementation, a video encoder uses a skewed DCT and a video decoder uses a skewed inverse DCT.

For the sake of simplicity, FIG. 23 does not show the various ways in which the technique (2300) can be used in conjunction with other techniques.

Following a frequency transform (e.g., DCT) of a residual block, the encoder (2310) quantizes the DC coefficient. The encoder reconstructs the DC coefficient by inverse quantization for use in later computations. The encoder then lifts (2320) one or more of the AC coefficients by adjusting the one or more AC coefficients as a function of the quantized DC coefficient. The encoder then quantizes (2330) the AC coefficients. Following steps in the encoder such as scanning and entropy coding of the quantized coefficients are not shown in FIG. 23.

In the decoder, following entropy decoding and scanning (not shown), the decoder inverse quantizes (2340) the AC coefficients and inverse quantizes (2350) the DC coefficient. The decoder then (2360) inverse lifts the one or more of the AC coefficients that were lifted by the encoder. The decoder then applies an inverse frequency transform (not shown) such as an inverse DCT to the inverse lifted coefficients.

In FIG. 23, the lifting and inverse lifting are a function of the DC coefficient. In alternative embodiments, the lifting and inverse lifting are a function of one or more AC coefficients as well.

D. Quantization and Dequantization

The video encoder quantizes the frequency coefficients of the residual blocks. In decoding, the video decoder inverse quantizes the frequency coefficients of the residual blocks.

In one embodiment, the DC transform coefficient of a block is quantized by a flat quantizer. The reconstruction rule to generate $\hat{y}$ given the quantized coefficient x is $\hat{y}=x\cdot QP$, where QP is the quantization parameter. Quantization of AC transform coefficients is performed by a nearly-flat quantizer which has equally sized bins, except for the wider bin centered at zero. When the quantized input AC transform coefficient is x, the dequantized reconstruction $\hat{y}$ is given by:

$$\hat{y} = \left\lfloor \frac{(x \cdot 2 \cdot QP + sgn(x) \cdot QP)R}{256} \right\rfloor, \quad (12)$$

where QP is the quantization parameter and R is a reconstruction value that is either a constant for all transform coefficients or a position-dependent value. The former case is the default mode of operation, while the latter case is termed non-flat (de)quantization. In the default mode, R is 256. In this mode, the division and round-down step may be eliminated. For non-flat (de)quantization, the value of R is determined from the array gaReconstructionLevels[ ] shown in FIG. 24. The element of the array to be used is the index of the transform coefficient in the zigzag scan, counting the DC coefficient as well.

The variable QP denotes the quantization step size. In practice, QP refers to two distinct step sizes, which are step-Size and stepSizeC. The latter quantity is used only for the chrominance DCT DC coefficient, and is related to stepSize as:

$$stepSizeC = \left\lfloor \frac{9 \cdot stepSize + 3}{8} \right\rfloor. \quad (13)$$

In embodiments that use the flat condition, quantization is defined at the decoder as well as the encoder. Quantization of DC coefficients proceeds by first computing an integer inverse QP:

$$iQP = \left\lfloor \frac{65536 + \lfloor QP/2 \rfloor}{QP} \right\rfloor. \quad (14)$$

The quantized value x corresponding to raw integer DC coefficient y is:

$$\left\lfloor \frac{y \cdot iQP + 32768}{65536} \right\rfloor. \quad (15)$$

The dequantized value $\hat{y}$ of quantized DC coefficient x is xQP.

Alternatively, the encoder/decoder use different techniques for quantization/dequantization.

E. Scan Order

Following quantization in the video encoder, the encoder scans a two-dimensional block of quantized frequency coefficients into a one-dimensional array for entropy encoding. The video decoder scans the one-dimensional array into a two-dimensional block before inverse quantization. A scan pattern indicates how elements of the two-dimensional block are ordered in the one-dimensional array. Both the encoder and the decoder use one or more scan patterns.

Figure 25:
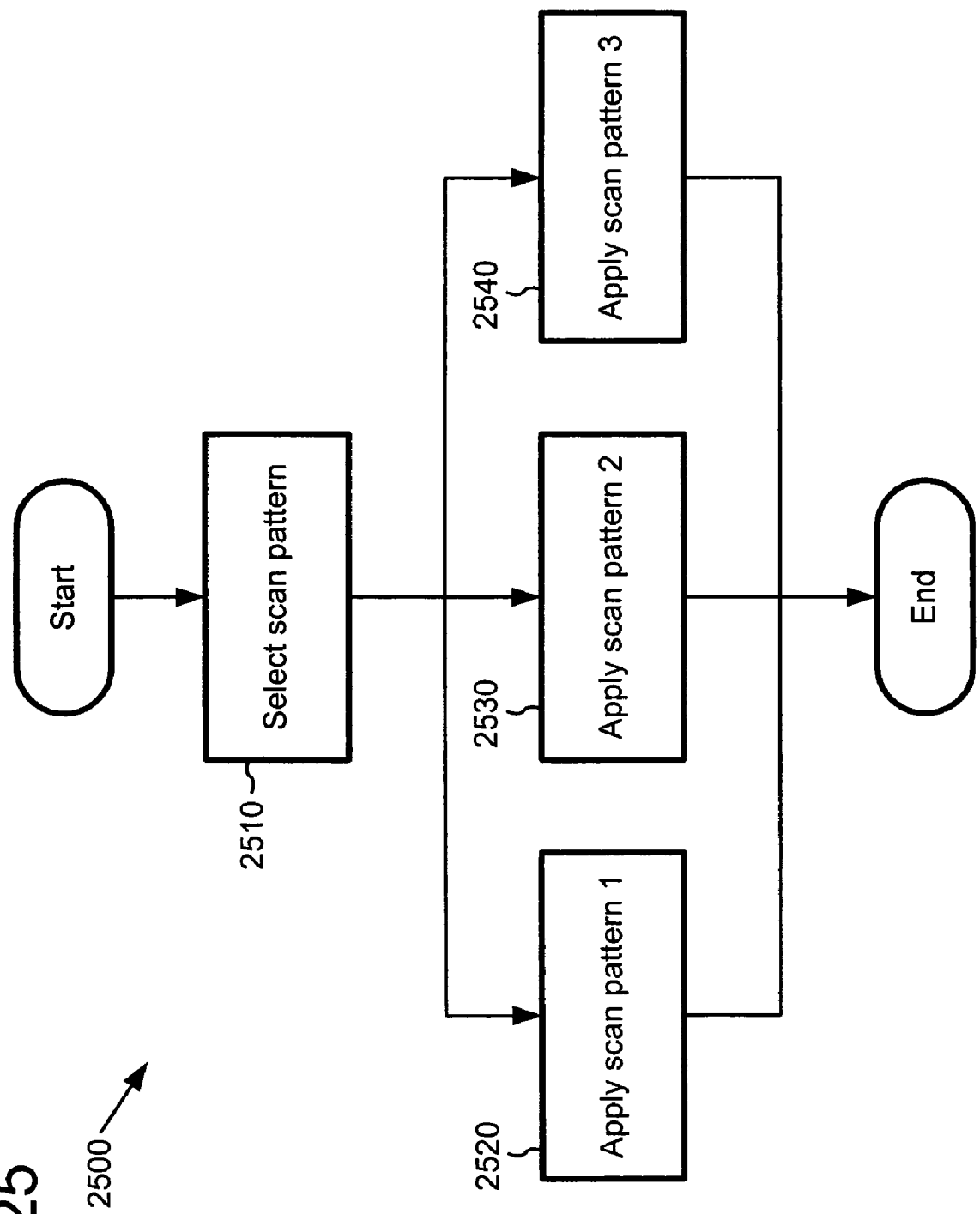
FIG. 25 is a flowchart showing a technique for scanning residual block values into a one-dimensional array using one of multiple available scan patterns.

In some embodiments, the encoder and decoder select between multiple, available scan patterns for a residual block. FIG. 25 shows a technique (2500) for selecting a scan pattern for a block of spatial extrapolation error values. FIG. 25 shows three available scan patterns. For example, these are horizontal, vertical, and null scan patterns. FIGS. 26a-26c show a null (i.e., normal) scan pattern (2601), a horizontal scan pattern (2602), and a vertical scan pattern (2603), respectively, in one implementation. Other implementations use different scan patterns and/or more or fewer scan patterns.

The encoder/decoder selects (2510) a scan pattern for scanning the residual block. For example, an encoder/decoder selects a scan pattern based upon contextual information for the block such as a meta-direction for the block. The meta-direction can be computed from the actual extrapolation mode of the block as shown in Table 2. For blocks which have only a predicted or default extrapolation mode, the meta-direction can be computed from that information. The encoder/decoder then applies (2520, 2530, or 2540) the selected scan pattern by reordering elements of a two-dimensional block into a one-dimensional array, or vice versa. For the sake of simplicity, FIG. 25 does not show the various ways in which the technique (2500) can be used in conjunction with other techniques.

Alternatively, the encoder/decoder selects between more or fewer scan patterns and/or selects a scan pattern based upon other criteria.

F. Significant Coefficient Estimation

Figure 27:
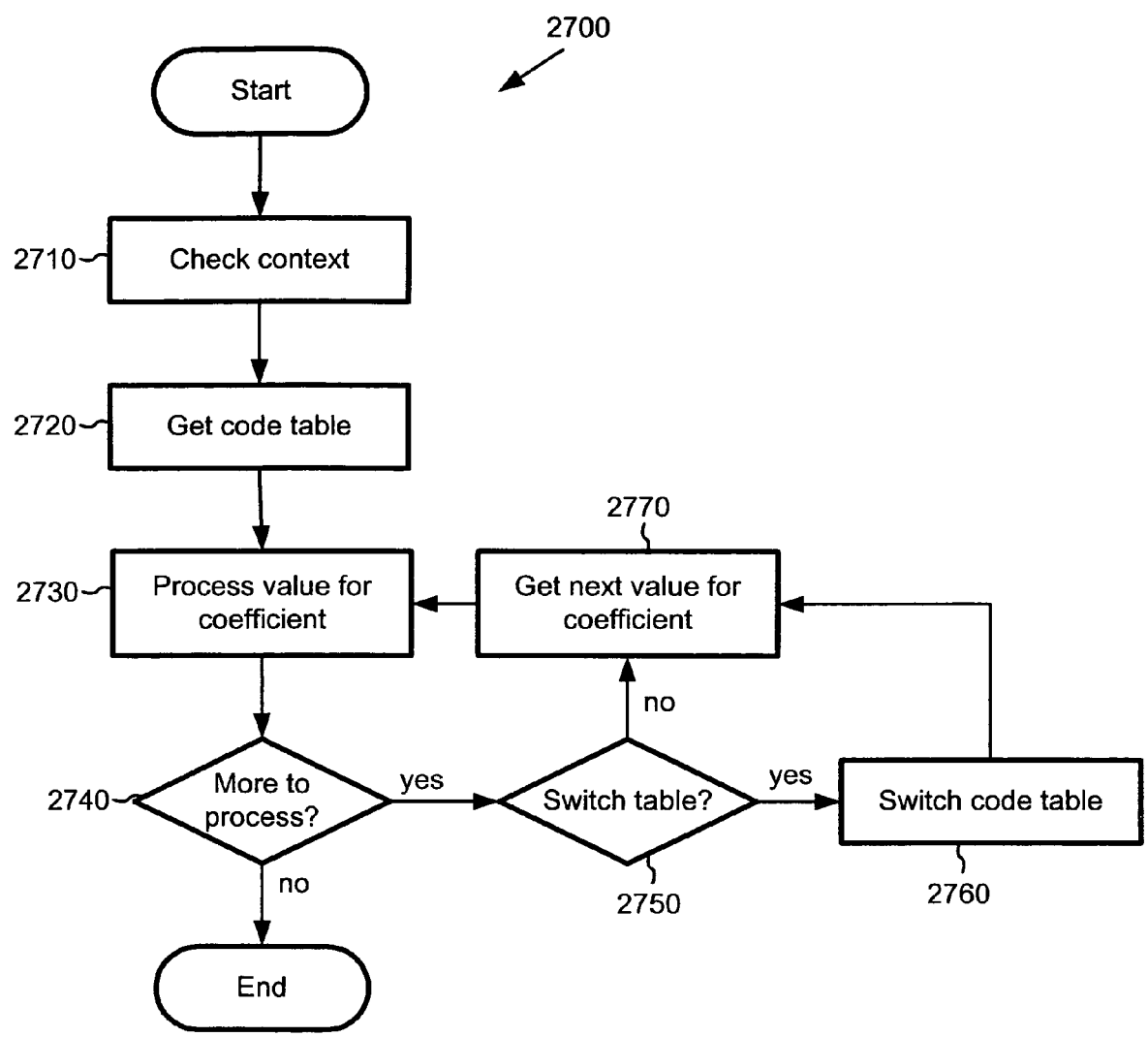
FIG. 27 is a flowchart showing a technique for selecting and switching between entropy code tables for encoding or decoding frequency coefficients for spatial extrapolation error values.

In the video encoder, quantized frequency coefficients that have been scanned into a one-dimensional array are entropy encoded using an entropy code table to map values to entropy codes. Conversely, in the video decoder, entropy-coded information is decoded into quantized frequency coefficients using an entropy code table to map entropy codes to values. FIG. 27 shows a technique for selecting and switching entropy code tables in an encoder/decoder when encoding/decoding frequency coefficients for an error block of a spatially predicted block. In one embodiment, the encoder/decoder encodes/decodes the first n AC coefficients using a first AC coefficient code table, and encodes/decodes the remaining AC coefficients using another AC coefficient code table. The quantized DC transform coefficient is coded using one of two DC coefficient code tables depending on whether n is zero. Alternatively, the encoder/decoder includes more than one code table switch (e.g. three or more batches of coefficients), uses different switching conditions (other than n), or applies table switching to more or fewer groupings of frequency coefficients (e.g., multiple different groups within the AC coefficients).

With reference to FIG. 27, the encoder/decoder checks (2710) context around the predicted block. The context is available at the encoder and the decoder, and forms a valid context for encoding and decoding. The context can be used for DC coefficients and/or AC coefficients. For example, the encoder/decoder computes a number n that predicts the number of significant coefficients in the error block. The encoder/decoder computes n based upon information in the causal neighbors of the predicted block. In one implementation, n is the minimum number of non-zero AC coefficients in the blocks to the left, top-left, and top of the predicted block. For blocks on the top row, n is the number of non-zero AC coefficients in the block to the left. Similarly, for blocks on the leftmost column, it is the number of non-zero AC coefficients in the block at the top. For the top left block, n is 16.

The encoder/decoder then selects (2720) an entropy code table. For example, the encoder/decoder selects the entropy code table used for the first batch of n frequency coefficients (up until the switch). Alternatively, the encoder/decoder use one of multiple available entropy code tables for the first batch of n frequency coefficients. The encoder can select the code table depending on contextual information, according to encoder settings, after closed loop testing of results with different tables, or after an open loop estimation of performance with different tables. The encoder can select the table for the first batch of coefficients on a sequence-by-sequence, frame-by-frame, block-by-block, switch-by-switch, or other basis. The encoder can use the same or different tables for luminance and chrominance information. When the table selection is not based upon context, the encoder outputs a flag or other information identifying the selected entropy code table. The decoder can select the code table based upon contextual information or based upon a table selection flag received from the encoder.

The encoder/decoder processes (2730) the value for a coefficient, for example, encoding a coefficient with an entropy code in the encoder, or decoding an entropy code to a coefficient value in the decoder. If the encoder/decoder determines (2740) that there are no more coefficients or entropy codes to process, the technique ends.

Otherwise, the encoder/decoder determines (2750) whether to switch entropy code tables. For example, the encoder/decoder checks whether it has encoded/decoded n coefficients yet.

If the encoder/decoder does not switch tables, the encoder/decoder gets (2770) the next value for a coefficient and processes (2730) it. For example, if n coefficients have not yet been processed, the encoder/decoder gets (2770) the next value for a coefficient and processes (2730) it.

Otherwise, the encoder/decoder switches (2760) tables. For example, the encoder/decoder selects the entropy code table used for the second batch of frequency coefficients (after n coefficients). Alternatively, the encoder/decoder use one of multiple available entropy code tables for the second batch of frequency coefficients, as previously described. The encoder/decoder then gets (2770) the next value for a coefficient and processes (2730) it.

For the sake of simplicity, FIG. 27 does not show the various ways in which the technique (2700) can be used in conjunction with other techniques.

In one implementation, an encoder and decoder use table switching based upon context as well as table selection information that is signaled. In a given I frame, all symbols of a certain type (or category) are encoded using one Huffman code table chosen out of a candidate set of tables for the type. The type is inferred from causal information available at the decoder. The index of the chosen table within the candidate set for the type is indicated by a fixed length code that precedes the first symbol of the particular type for the frame.

In this implementation, the type of a symbol includes a dependence on QP, which indicates typical low bitrate (e.g., QP>12) or high bitrate (e.g., QP<=12) conditions.

In this implementation, the DC coefficient (absolute value level) is coded jointly with a binary symbol last that signals whether there are any subsequent coefficients (last=false) or not (last=true). The joint symbol level-last is translated into a bin index and a fine address within the bin. The size of each bin (i.e., the number of joint level-last symbols in the bin, which can vary depending on the index) is known at the decoder and is $2^k$. The fine address for a bin is k bits long, uniquely and efficiently specifying the symbol within the bin. The index values are Huffman coded. Six types are defined for DC coefficients, three types each for low bitrate and high bitrate scenarios. The three types are shown in Table 6. Huffman code tables for each type are drawn from a candidate set of tables.

TABLE 6

Types for DC coefficients

| Type | Context |
|---|---|
| LH_INTRAZ | Luminance block; count n of non-zero AC coefficients in causal blocks is zero. |
| LH_INTRANZ | Luminance block; count n of non-zero AC coefficients in causal blocks is non-zero. |
| LH_INTRAC0 | Chrominance block. |

In this implementation, the first coded symbol (for the DC coefficient) in the transform block indicates whether there are subsequent AC value symbols. If there are, the AC value symbols are run-length encoded as a combination of run, level, and last values. The run value corresponds to the number of zero-values transform coefficients separating the current coefficient from the previously coded coefficient. Level is the magnitude of the current (nonzero) coefficient, and last is a boolean variable denoting whether the current coefficient is the last in the current block.

In this implementation, the run-level-last space is mapped into an index-fine space, where index is an address that partitions the run-level-last space into several bins (each bin containing $2^k$ symbols) and fine is k bits uniquely identifying symbols within bins. Some bins may contain only a single triple (k=0) whereas other bins contain multiple triples (k>0). For uncommon run-level-last values, index values may be used as escape symbols. The index values are Huffman coded. Eight types are defined for AC coefficients, four types each for low bitrate and high bitrate scenarios. The four types are shown in Table 7. Huffman code tables for each type are drawn from a candidate set of tables.

TABLE 7

Types for AC coefficients

| Type | Context |
| --- | --- |
| LH_INTER0 | Luminance block; DIFFORIENT value > 4. |
| LH_INTRAY | Luminance block; DIFFORIENT <= 4; current symbol count is less than count n of non-zero AC coefficients in causal blocks. |
| LH_INTRAY0 | Luminance block; DIFFORIENT <= 4; current symbol count is greater than or equal to count n of non-zero AC coefficients in causal blocks. |
| LH_INTER | Chrominance block. |

Alternative embodiments use different entropy coding and decoding techniques.

G. In-Loop Deblocking

Quantization and other lossy processing of the residual blocks for predicted blocks can introduce blocky artifacts into a frame. In some embodiments, an encoder/decoder applies a deblocking filter within a spatial extrapolation loop. The deblocking filter can be the same or different filter than a filter used in post-processing. The deblocking filter removes boundary discontinuities between a reconstructed predicted block and neighboring reconstructed blocks, which improves the quality of spatial extrapolation for subsequent predicted blocks. The encoder/decoder performs deblocking after decoding a block in order for spatial prediction to work as expected. This contrasts with the typical deblocking processes, which operate on the whole image after decoding.

Figure 29:
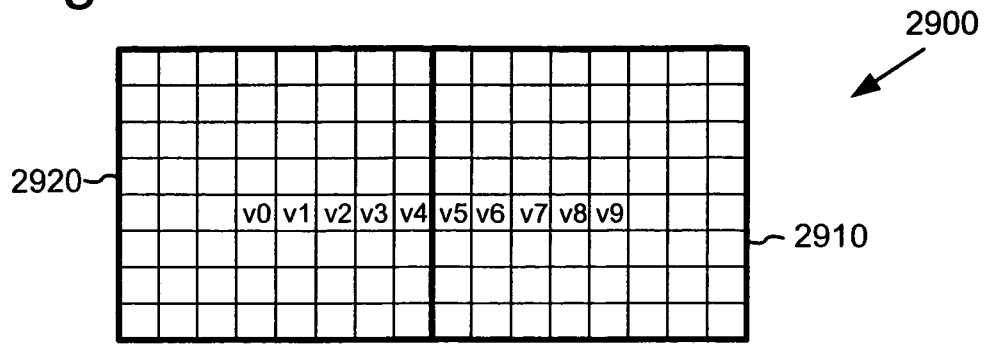
FIG. 29 is a diagram showing a horizontal deblocking filter used in spatial extrapolation of blocks of pixels.
Figure 28:
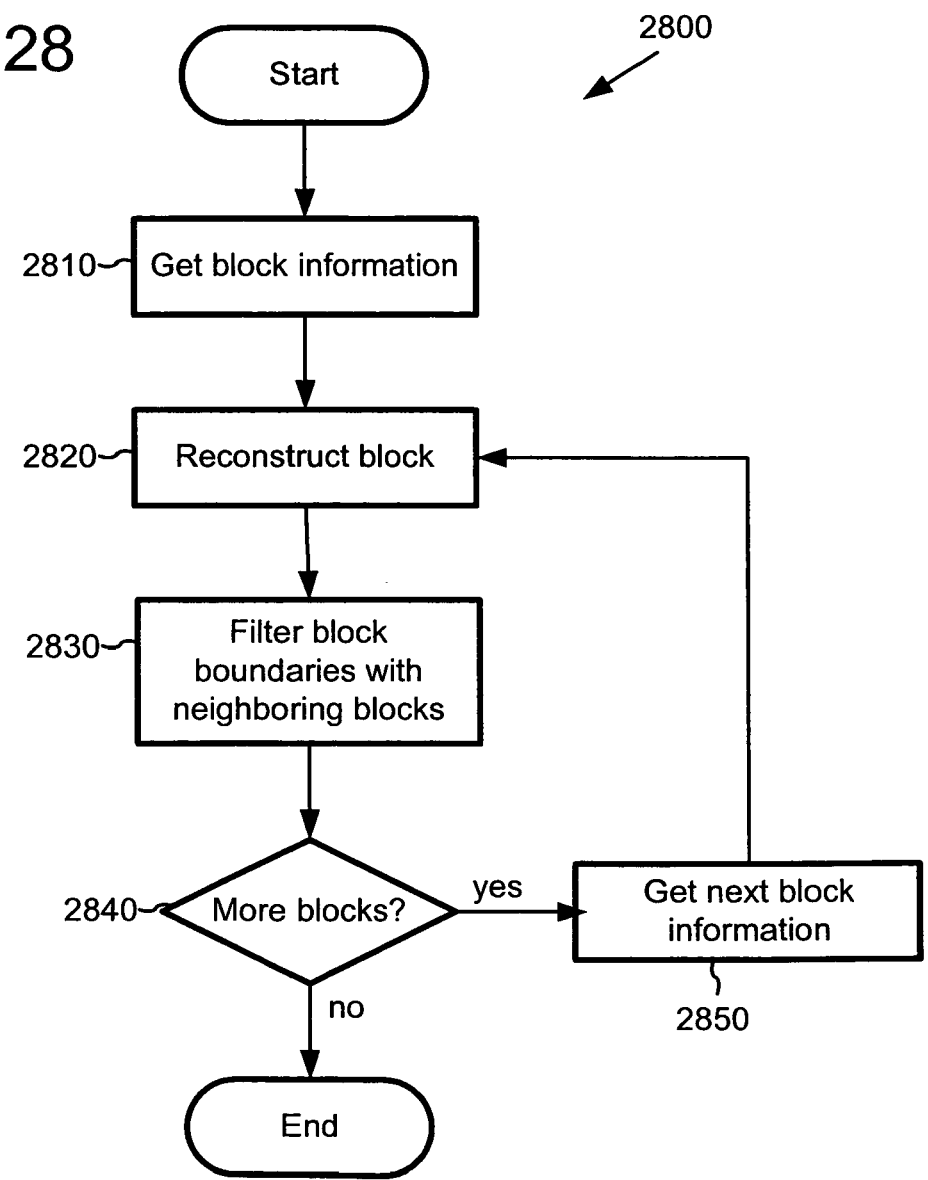
FIG. 28 is a flowchart showing a technique for applying a deblocking filter to blocks of a frame in a spatial extrapolation loop.

FIG. 28 shows a technique (2800) for reducing blockiness in a decoded frame using a deblocking filter in a video encoder or decoder. For the sake of simplicity, FIG. 28 does not show spatial extrapolation itself or other ways in which the technique (2800) can be used in conjunction with other techniques. FIG. 29 shows an example of pixel locations that are considered in one implementation for filtering the boundary between a predicted block (2910) and the block (2920) to its left. Block boundaries are marked by bold lines.

With reference to FIG. 28, a video encoder/decoder gets (2810) block information for a predicted block and reconstructs (2820) the predicted block. For example, the encoder/decoder gets extrapolation mode information and residual information, decompresses it if necessary, performs spatial extrapolation if necessary, and combines the residual and extrapolation to reconstruct the block.

The video encoder/decoder filters (2830) the boundaries of the predicted block with neighboring reconstructed blocks. For example, after decoding an 8×8 block in either luminance or chrominance planes, the left and top edges of the block are subjected to a deblocking filter process.

In one implementation, the deblocking procedure is similar to MPEG-4 deblocking with a key difference. The criterion for deciding the existence of a discontinuity is dependent on the quantization parameter QP, which allows the deblocking filter to disregard false discontinuities that may be caused by the skewed IDCT. A horizontal deblocking filter operates on a left-right pair of blocks, and a vertical deblocking filter operates on a top-bottom pair. Horizontal and vertical deblocking filters are transposes. The horizontal deblocking filter is explained here with reference to FIG. 29.

As in MPEG-4, two deblocking modes are used—one mode applies a short filter to one pixel on either side of the block edge whereas the other mode applies a longer filter to two pixels on either side. For each of the eight horizontal edge pixel-pairs labeled as v4-v5 in FIG. 29, an edge strength E is computed:

$$E = \phi(v0 - v1) + \phi(v1 - v2) + \phi(v2 - v3) + \phi(v3 - v4) + \qquad (16)$$
$$\phi(v4 - v5) + \phi(v5 - v6) + \phi(v6 - v7) + \phi(v7 - v8) +$$
$$\phi(v8 - v9),$$

$$\phi(x) = \begin{cases} 1 & \text{if } |x| \le T \\ 0 & \text{otherwise} \end{cases}, \qquad (17)$$

$$T = \left\lfloor \frac{QP + 10}{8} \right\rfloor. \qquad (18)$$

If E is less than 6, the encoder/decoder chooses the short filter, which is defined as in MPEG-4. If E is greater than or equal to 6, the range of the values v0 through v9 is computed. Range is defined as the maximum minus the minimum value of these ten variables. If the range is greater than or equal to 2QP, the encoder/decoder uses the short filter. Otherwise, the long filter is applied, and v3 through v6 are modified as follows $$v3' = \left\lfloor \frac{4v2 + 3v3 + v7 + 4}{8} \right\rfloor, \qquad (19)$$

$$v4' = \left\lfloor \frac{3v2 + 3v4 + 2v7 + 4}{8} \right\rfloor, \qquad (20)$$

$$v5' = \left\lfloor \frac{3v7 + 3v5 + 2v2 + 4}{8} \right\rfloor, \qquad (21)$$

$$v6' = \left\lfloor \frac{4v7 + 3v6 + v2 + 4}{8} \right\rfloor. \qquad (22)$$

The encoder/decoder performs no vertical deblocking for the top row of blocks and no horizontal deblocking for the left column. Horizontal deblocking is followed by vertical deblocking for the block. Other binary conditions relating to existence of residuals (which are non-zero transform coefficients for the current block) and absolute spatial orientation also apply:

```
deblock(int blockX, int blockY, bool bResidual, int iOrient)
{
    if ((blockY > 0) && (bResidual || (iOrient != 0 && iOrient != 4)))
        horizontalDeblockFilter( );
    if ((blockX > 0) && (bResidual || (iOrient != 0 && iOrient != 8)))
        verticalDeblockFilter( );
}
``` where blockX and blockY are horizontal and vertical block indices, bResidual is true when the flat condition is activated or when there is at least one non-zero coefficient in the residual, and iOrient is the absolute orientation direction.

In other implementations, the filter definitions, number of different filters, and/or adaptive filtering conditions are different than above. In alternative embodiments, only those pixels that contribute to spatial extrapolation of subsequent blocks are filtered by the in-loop deblocking filter.

Following the filtering, the encoder/decoder determines (2840) whether there are any more blocks in the frame. If not, the technique ends. If so, the encoder/decoder gets (2850) block information for the next predicted block and reconstructs (2820) the next predicted block.

In some embodiments, the video encoder enables or disables in-loop deblocking of predicted blocks based upon encoder settings, context information, or other criteria. The encoder can embed a switch at a frame, sequence, or other level to enable/disable deblocking.

IV. Interframe Encoding and Decoding

Inter-frame coding exploits temporal redundancy between frames to achieve compression. Temporal redundancy reduction uses previously coded frames as predictors when coding the current frame.

A. Motion Estimation

In one or more embodiments, a video encoder exploits temporal redundancies in typical video sequences in order to code the information using a smaller number of bits. The video encoder uses motion estimation/compensation of a macroblock or other set of pixels of a current frame with respect to a reference frame. A video decoder uses corresponding motion compensation. For additional detail about motion estimation and motion compensation in some embodiments, see U.S. patent application Ser. No. 10/322,351, entitled "Multi-Resolution Motion Estimation and Compensation," filed Dec. 17, 2002.

B. Coding of Prediction Residuals

Motion estimation is rarely perfect, and the video encoder uses prediction residuals to represent the differences between the original video information and the video information predicted using motion estimation. In one or more embodiments, a video encoder exploits redundancies in prediction residuals in order to code the information using a smaller number of bits. For additional detail about coding of prediction residuals in some embodiments, see U.S. patent application Ser. No. 10/322,352, entitled "Sub-Block Transform Coding of Prediction Residuals," filed Dec. 17, 2002.

C. Loop Filtering

Quantization and other lossy processing of prediction residuals can cause blocky artifacts in reference frames that are used for motion estimation/compensation for subsequent predicted frames. In one or more embodiments, a video encoder processes a reconstructed frame to reduce blocky artifacts prior to motion estimation using the reference frame. A video decoder processes the reconstructed frame to reduce blocky artifacts prior to motion compensation using the reference frame. With deblocking, a reference frame becomes a better reference candidate to encode the following frame. Thus, using the deblocking filter improves the quality of motion estimation/compensation, resulting in better prediction and lower bitrate for prediction residuals. For additional detail about using a deblocking filter in motion estimation/compensation in some embodiments, see U.S. patent application Ser. No. 10/322,383, entitled "Motion Compensation Loop With Filtering," filed Dec. 17, 2002.

Having described and illustrated the principles of my invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. In a computing device that implements a video decoder, a method of decoding blocks of pixels in a video frame of a video sequence, the method comprising:
   with the computing device that implements the video decoder, for a current block of plural pixels in the video frame of the video sequence,
      identifying plural context pixels in the video frame, wherein the plural context pixels form at least part of a causal neighborhood for the current block;
      predicting a spatial extrapolation mode for the current block based upon plural contextual spatial extrapolation modes, the plural contextual spatial extrapolation modes including a first contextual spatial extrapolation mode for a first causal block above the current block, the first contextual spatial extrapolation mode indicating how spatial extrapolation was performed for pixel values of plural pixels of the first causal block, the plural contextual spatial extrapolation modes further including a second contextual spatial extrapolation mode for a second causal block left of the current block, the second contextual spatial extrapolation mode indicating how spatial extrapolation was performed for pixel values of plural pixels of the second causal block;
      computing an actual spatial extrapolation mode for the current block based at least in part upon the predicted spatial extrapolation mode for the current block; and
      computing a spatial extrapolation according to the actual spatial extrapolation mode for pixel values of the plural pixels of the current block based at least in part upon pixel values of the plural context pixels, wherein the spatial extrapolation comprises one or more pixel value extrapolations from one or more of the plural context pixels into the current block to thereby spatially predict the pixel values of the plural pixels of the current block.

2. The method of claim 1 further comprising reconstructing a residual for the current block.

3. The method of claim 2 further comprising selecting a scan pattern for the residual from among plural scan patterns.

4. The method of claim 1 wherein the actual spatial extrapolation mode for the current block is selected from among plural spatial extrapolation modes, wherein the plural spatial extrapolation modes include a horizontal mode, a vertical mode, and a flat mode, and wherein the flat mode uses a DC value derived from the pixel values of the plural context pixels.

5. A computer-readable storage medium storing computer-executable instructions for causing the computing device to perform the method of claim 1 during video decoding.

6. The method of claim 1 further comprising:
   reconstructing a residual for the current block; and
   reconstructing the current block from the residual and the spatial extrapolation for the pixel values of the plural pixels of the current block.

7. The method of claim 6 further comprising filtering the reconstructed current block to reduce boundary discontinuities with the plural context pixels.

8. The method of claim 1 wherein the pixel values are luminance values.

9. The method of claim 1 wherein the pixel values are chrominance values.

10. The method of claim 1 further comprising, at the computing device that implements the video decoder, receiving from a bit steam information that at least in part indicates the actual spatial extrapolation mode when considered with the predicted spatial extrapolation mode, wherein the computing the actual spatial extrapolation mode for the current block includes evaluating the received information in view of the predicted spatial extrapolation mode.

11. The method of claim 10 further comprising entropy decoding the received information.

12. The method of claim 1 further comprising, with the computing device that implements the video decoder, before the identifying the plural context pixels:
performing the spatial extrapolation for the pixel values of the plural pixels of the first causal block;
reconstructing a residual for the first causal block;
reconstructing the first causal block from the residual for the first causal block and the spatial extrapolation for the pixel values of the plural pixels of the first causal block;
performing the spatial extrapolation for the pixel values of the plural pixels of the second causal block;
reconstructing a residual for the second causal block; and
reconstructing the second causal block from the residual for the second causal block and the spatial extrapolation for the pixel values of the plural pixels of the second causal block, wherein the first causal block and/or the second causal block include at least some of the plural context pixels.

13. The method of claim 1 wherein the predicting the spatial extrapolation mode for the current block includes:
determining a first meta-direction from the first contextual spatial extrapolation mode for the first causal block;
determining a second meta-direction from the second contextual spatial extrapolation mode for the second causal block; and
determining the predicted spatial extrapolation mode using the first meta-direction and the second meta-direction.

14. In a computing device that implements a video decoder, a method of decoding a current block of pixels of a video frame of a video sequence, the method comprising:
with the computing device that implements the video decoder, predicting a spatial extrapolation mode for the current block based upon plural contextual spatial extrapolation modes, the plural contextual spatial extrapolation modes including a first contextual spatial extrapolation mode for a first causal block above the current block in the video frame, the first contextual spatial extrapolation mode indicating how spatial extrapolation was performed for pixel values of plural pixels of the first causal block, the plural contextual spatial extrapolation modes further including a second contextual spatial extrapolation mode for a second causal block left of the current block in the video frame, the second contextual spatial extrapolation mode indicating how spatial extrapolation was performed for pixel values of plural pixels of the second causal block; and
with the computing device that implements the video decoder, computing an actual spatial extrapolation mode for the current block, wherein the computing is based at least in part upon the predicted spatial extrapolation mode for the current block, and wherein the actual spatial extrapolation mode for the current block indicates bow to compute a spatial extrapolation for pixel values of plural pixels of the current block, the spatial extrapolation using one or more pixel value extrapolations from one or more context pixels around the current block to spatially predict the pixel values of the plural pixels of the current block.

15. A computer-readable storage medium storing computer-executable instructions for causing the computing device to perform the method of claim 14 during video decoding.

16. The method of claim 14 further comprising receiving information at least in part indicating the actual spatial extrapolation mode when considered with the predicted spatial extrapolation mode, wherein the computing includes evaluating the received information in view of the predicted spatial extrapolation mode.

17. The method of claim 16 further comprising entropy decoding the received information.

18. In a computing device that implements a video decoder, a method comprising:
receiving, at the computing device that implements the video decoder, encoded data in a bit stream, wherein the encoded data includes information that at least in part indicates an actual spatial extrapolation mode for a current block of a video frame; and
with the computing device that implements the video decoder, reconstructing the video frame using the encoded data, including:
predicting spatial extrapolation mode for the current block based upon plural contextual spatial extrapolation modes, the plural contextual spatial extrapolation modes including a first contextual spatial extrapolation mode for a first causal block above the current block in the video frame, the first contextual spatial extrapolation mode indicating how spatial extrapolation was performed for pixel values of plural pixels of the first causal block, the plural contextual spatial extrapolation modes farther including a second contextual spatial extrapolation mode for a second causal block left of the current block in the video frame, the second contextual spatial extrapolation mode indicating how spatial extrapolation was performed for pixel values of plural pixels of the second causal block;
computing the actual spatial extrapolation mode for the current block, wherein the computing includes evaluating the received information in view of the predicted spatial extrapolation mode for the current block; and
computing a spatial extrapolation for pixel values of plural pixels of the current block according to the actual spatial extrapolation mode for the current block, wherein the spatial extrapolation uses one or more pixel value extrapolations from one or more context pixels around the current block to spatially predict the pixel values of the plural pixels of the current block.

19. The method of claim 18 wherein the reconstructing further comprises entropy decoding the received information.

20. The method of claim 18 further comprising:
decoding a residual for the current block; and
combining the residual and the spatial extrapolation for the current block.

21. In a computing device that implements a video encoder, a method of encoding a current block of pixels of a video frame of a video sequence, the method comprising:
with the computing device that implements the video encoder, predicting a spatial extrapolation mode for the current block based upon plural contextual spatial extrapolation modes, the plural contextual spatial extrapolation modes including a first contextual spatial extrapolation mode for a first causal block above the current block in the video frame, the first contextual spatial extrapolation mode indicating how spatial extrapolation was performed for pixel values of plural pixels of the first causal block, the plural contextual spatial extrapolation modes further including a second contextual spatial extrapolation mode for a second causal block left of the current block in the video frame, the second contextual spatial extrapolation mode indicating how spatial extrapolation was performed for pixel values of plural pixels of the second causal block; and with the computing device that implements the video encoder, computing an actual spatial extrapolation mode for the current block, wherein the computing is based at least in part upon the predicted spatial extrapolation mode for the current block, and wherein the actual spatial extrapolation mode for the current block indicates bow to compute a spatial extrapolation for pixel values of plural pixels of the current block, the spatial extrapolation using one or more pixel value extrapolations from one or more context pixels around the current block to spatially predict the pixel values of the plural pixels of the current block.

22. The method of claim 21 Farther comprising, from the computing device that implements the video encoder, outputting information at least in part indicating the actual spatial extrapolation mode when considered with the predicted spatial extrapolation mode.

23. The method of claim 22 further comprising, with the computing device that implements the video encoder, entropy encoding the information before the outputting.

* * * * *